(12) United States Patent
Kato et al.

(10) Patent No.: US 12,723,929 B2
(45) Date of Patent: Sep. 1, 2026

(54) TEMPERATURE SENSOR AND SENSOR ATTACHMENT STRUCTURE

(71) Applicant: Yazaki Corporation, Tokyo (JP)

(72) Inventors: Shinpei Kato, Shizuoka (JP); Shingo Nomoto, Shizuoka (JP); Daichi Muramoto, Shizuoka (JP); Shinpei Ando, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 294 days.

(21) Appl. No.: 18/584,535

(22) Filed: Feb. 22, 2024

(65) Prior Publication Data

US 2024/0192062 A1 Jun. 13, 2024

Related U.S. Application Data

(63) Continuation of application No. PCT/JP2023/002323, filed on Jan. 25, 2023.

(30) Foreign Application Priority Data

Feb. 14, 2022 (JP) ................................ 2022-020343

(51) Int. Cl.
*G01K 13/02* (2021.01)
*G01K 1/14* (2021.01)

(52) U.S. Cl.
CPC ............ *G01K 13/026* (2021.01); *G01K 1/14* (2013.01)

(58) Field of Classification Search
None
See application file for complete search history.

(56) References Cited

U.S. PATENT DOCUMENTS

2015/0377713 A1 12/2015 Shibayama
2020/0332685 A1* 10/2020 Muramoto .......... G01L 19/0627

FOREIGN PATENT DOCUMENTS

JP 6075398 B2 2/2017

* cited by examiner

*Primary Examiner* — Erica S Lin
(74) *Attorney, Agent, or Firm* — Sughrue Mion, PLLC

(57) ABSTRACT

A temperature sensor includes: an insertion part inserted into an attachment partner; an abutting part provided on the insertion part and abutting the attachment partner when the insertion part is completely inserted into the attachment partner; a locked part provided on the abutting part and locked with a locking projection of the attachment partner; and a projection provided on the insertion part, inserted into a cutout provided in the attachment partner, clamping the attachment partner together with the abutting part in an insertion direction of the insertion part, and clamping the attachment partner together with the locked part in a direction crossing the insertion direction of the insertion part.

5 Claims, 18 Drawing Sheets

(UPPER)
HEIGHT
(LOWER)
TRANSVERSE
17
57
19
15
59
13
11
55

TEMPERATURE SENSOR AND SENSOR ATTACHMENT STRUCTURE

CROSS-REFERENCE TO RELATED APPLICATIONS

The present application is a continuation of International Application No. PCT/JP2023/002323, filed on Jan. 25, 2023, and based upon and claims the benefit of priority from Japanese Patent Application No. 2022-020343, filed on Feb. 14, 2022, the entire contents of which are incorporated herein by reference.

TECHNICAL FIELD

The present application relates to a temperature sensor and a sensor attachment structure.

BACKGROUND ART

PTL 1 (JP 6075398 B2) discloses a temperature sensor in which an attachment part is formed as a metal housing and is mounted on and fixed to an attachment partner by fastening a male thread provided on the metal housing to a female thread of the attachment partner.

SUMMARY

In the temperature sensor described in PTL 1, since the temperature sensor is mounted on the attachment partner by screw fastening, it takes time to attach the temperature sensor to the attachment partner. In addition, in the temperature sensor described in PTL 1, when the temperature sensor is attached to the attachment partner, it is necessary to control a torque applied to a screw, and good workability is not obtained when the temperature sensor is mounted on the attachment partner.

It is an object of the present application to provide a temperature sensor and a sensor attachment structure having good workability when the temperature sensor is mounted on the attachment partner.

A temperature sensor according to an embodiment includes: a sensor body; a first abutting part provided on the sensor body and abutting a first abutted part of an attachment partner when attachment of the temperature sensor to the attachment partner is conducted; a locked part provided on the sensor body and locked with a locking part of the attachment partner when attachment of the temperature sensor to the attachment partner is conducted; and a second abutting part provided on the sensor body, abutting a second abutted part of the attachment partner when attachment of the temperature sensor to the attachment partner is conducted, clamping the attachment partner together with the first abutting part in a predetermined first direction, and clamping the attachment partner together with the locked part in a predetermined second direction.

A temperature sensor according to an embodiment includes: an insertion part inserted into an attachment partner; an abutting part integrally provided on the insertion part and abutting the attachment partner when the insertion part is completely inserted into the attachment partner; a locked part provided on the abutting part and locked with a locking projection of the attachment partner; and a projection integrally provided on the insertion part, inserted into a cutout provided in the attachment partner, clamping the attachment partner together with the abutting part in an insertion direction of the insertion part, and clamping the attachment partner together with the locked part in a direction crossing the insertion direction of the insertion part.

A sensor attachment structure according to an embodiment includes: an attachment partner including a cylindrical part, a flange provided at an end of the cylindrical part, a cutout formed in the flange, and a locking projection projecting from the flange on an opposite side to the cylindrical part; and a sensor including an insertion part inserted into the cylindrical part, an abutting part provided at one end of the insertion part integrally with the insertion part and abutting the flange when the insertion part is completely inserted into the cylindrical part, a locked part provided on the abutting part and locked with a locking projection, and a projection integrally provided on the insertion part, inserted into a cutout provided in the flange, clamping the flange together with the abutting part in an insertion direction of the insertion part, and clamping the flange together with the locked part in a direction crossing the insertion direction of the insertion part.

BRIEF DESCRIPTION OF THE DRAWINGS

FIG. 4 is a IV arrow view in FIG. 2.

FIG. 5 is a V arrow view of FIG. 2.

DETAILED DESCRIPTION

Figure 1:
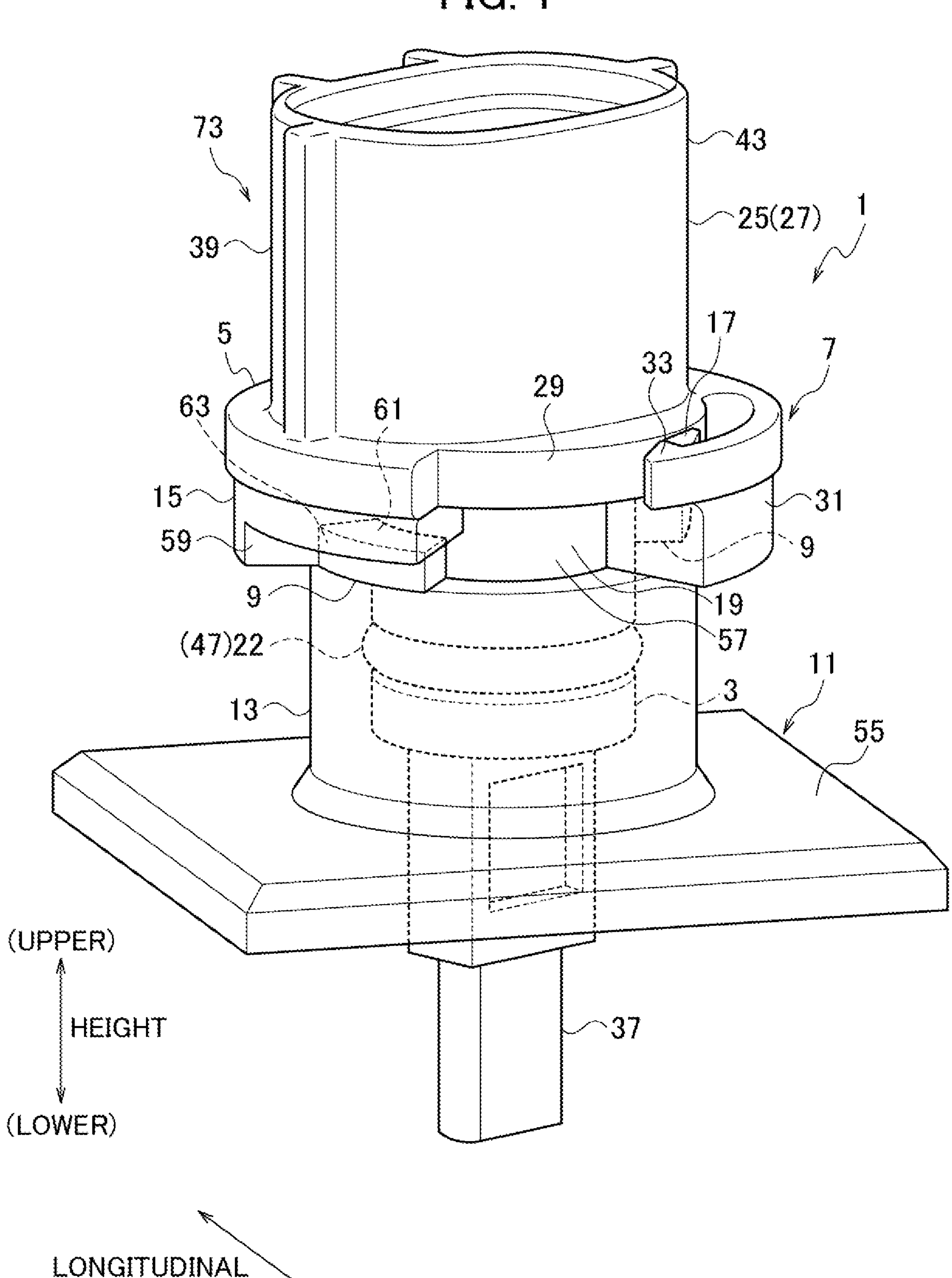
FIG. 1 is a perspective view illustrating a sensor attachment structure according to an embodiment.
Figure 2:
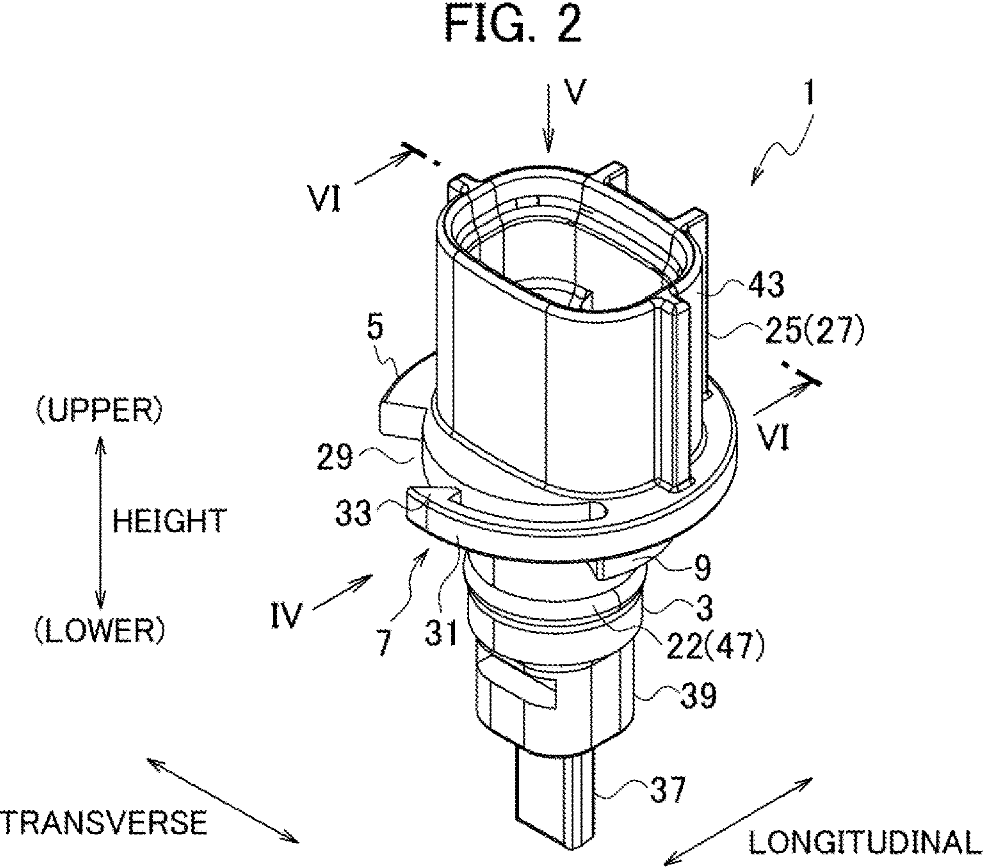
FIG. 2 is a perspective view illustrating a temperature sensor according to the embodiment.
Figure 3:
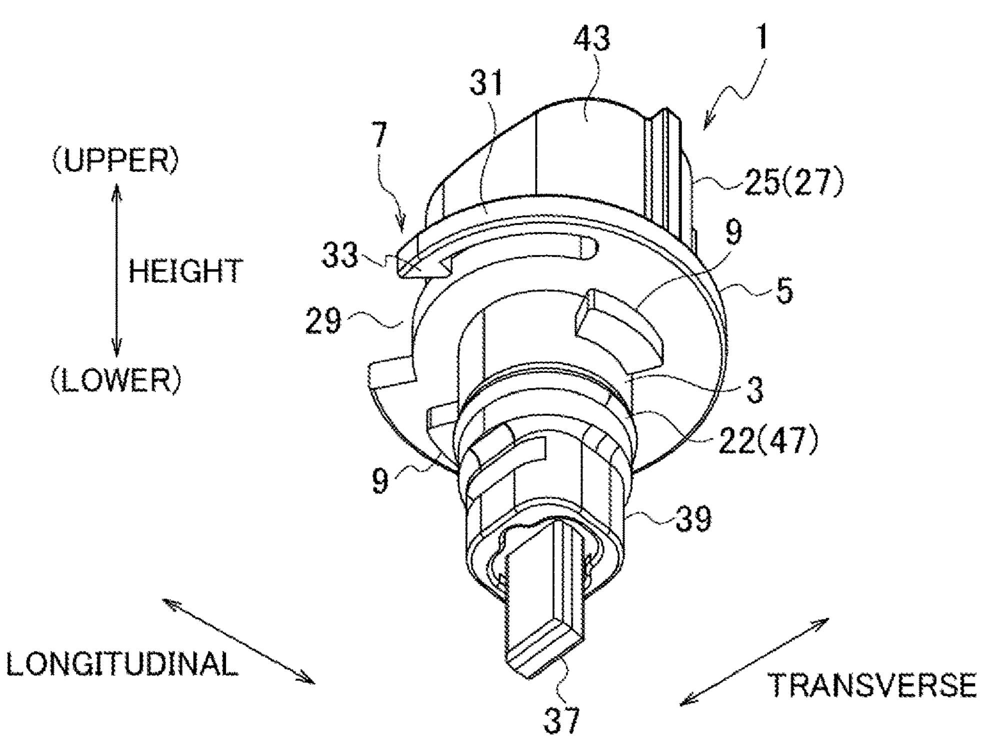
FIG. 3 is a perspective view illustrating the temperature sensor according to the embodiment from another angle.

Hereinafter, a temperature sensor 1 according to an embodiment will be described in detail with reference to the drawings. The temperature sensor 1 according to the embodiment measures a temperature of a fluid such as an LLC (long life coolant).

Here, for the convenience of explanation, a predetermined direction of the temperature sensor 1 is a longitudinal direction, a predetermined direction orthogonal to the longitudinal direction is a transverse direction, and a direction orthogonal to the longitudinal direction and the transverse direction is a height direction.

As illustrated in FIGS. 1 to 6, the temperature sensor 1 includes an insertion part 3, an abutting part 5, a locked part (locking hook) 7, and a projection (fixing rib) 9.

The insertion part 3 is a part inserted into a cylindrical part 13 of an attachment partner 11 when the temperature sensor 1 is attached to the attachment partner 11. The abutting part 5 is provided at one end (upper end) of the insertion part 3 integrally with the insertion part 3. That is, the abutting part 5 projects from the upper end of the insertion part 3. The abutting part 5 is a part abutting a flange 15 of the attachment partner 11 when the insertion part 3 is completely inserted into the cylindrical part 13 of the attachment partner 11.

The locked part 7 is provided on the abutting part 5. The locked part 7 is locked with the locking projection 17 of the attachment partner 11 when the temperature sensor 1 is completely attached to the attachment partner 11. The attachment of the temperature sensor 1 to the attachment partner 11 is performed by turning the temperature sensor 1 at a predetermined angle with respect to the attachment partner 11 with the center axes of the attachment partner 11 and the insertion part 3 as turning centers after the insertion part 3 is completely inserted into the cylindrical part 13 of the attachment partner 11.

Figure 11:
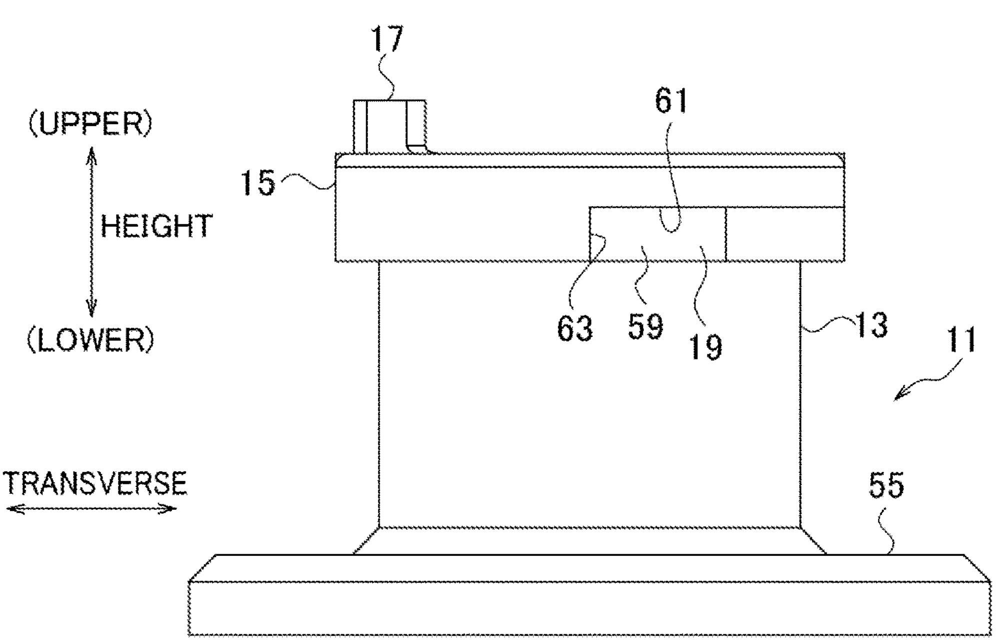
FIG. 11 is a XI arrow view in FIG. 9.
Figure 12:
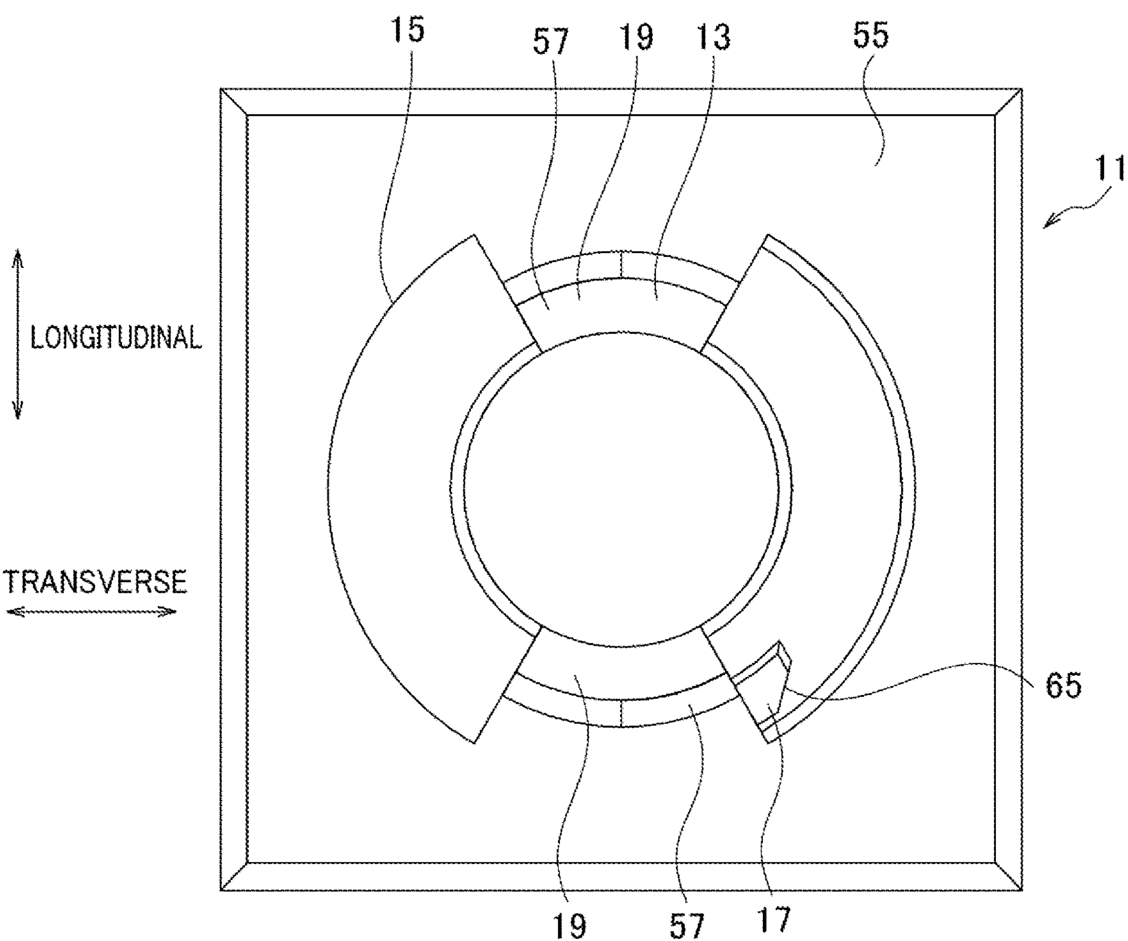
FIG. 12 is a XII arrow view in FIG. 9.

A projection 9 is provided on the insertion part 3, projecting from the insertion part 3. When the temperature sensor 1 is completely attached to the attachment partner 11, the projection 9 enters a cutout 19 provided in the flange 15 of the attachment partner 11 and abuts surfaces (abutting surfaces) 61, 63 (see FIG. 11, etc.) of the cutout 19.

When the temperature sensor 1 is completely attached to the attachment partner 11, the projection 9 clamps the flange 15 of the attachment partner 11 together with the abutting part 5 in a direction of insertion (height direction) of the insertion part 3 into the attachment partner 11. A thickness direction of the flange 15 of the attachment partner 11 is the height direction.

When the temperature sensor 1 is completely attached to the attachment partner 11, the projection 9 clamps the flange 15 of the attachment partner 11 together with the locked part 7 in a direction crossing the insertion direction of the insertion part 3 (for example, an orthogonal direction). A direction perpendicular to the insertion direction of the insertion part 3 is a circumferential direction of the flange 15 of the attachment partner 11.

When the temperature sensor 1 is completely attached to the attachment partner 11, the abutting part 5 and the locked part 7 clamp the attachment partner 11 together with the projection 9 in the two directions described above. Further, when the attachment to the attachment partner 11 is completed, the insertion part 3 is inserted into the cylindrical part 13 in a close fit state by utilizing elasticity of an O-ring 22 (see FIG. 6). As a result, the temperature sensor 1 is integrally mounted on the attachment partner 11 in a state without rattling.

Figure 6:
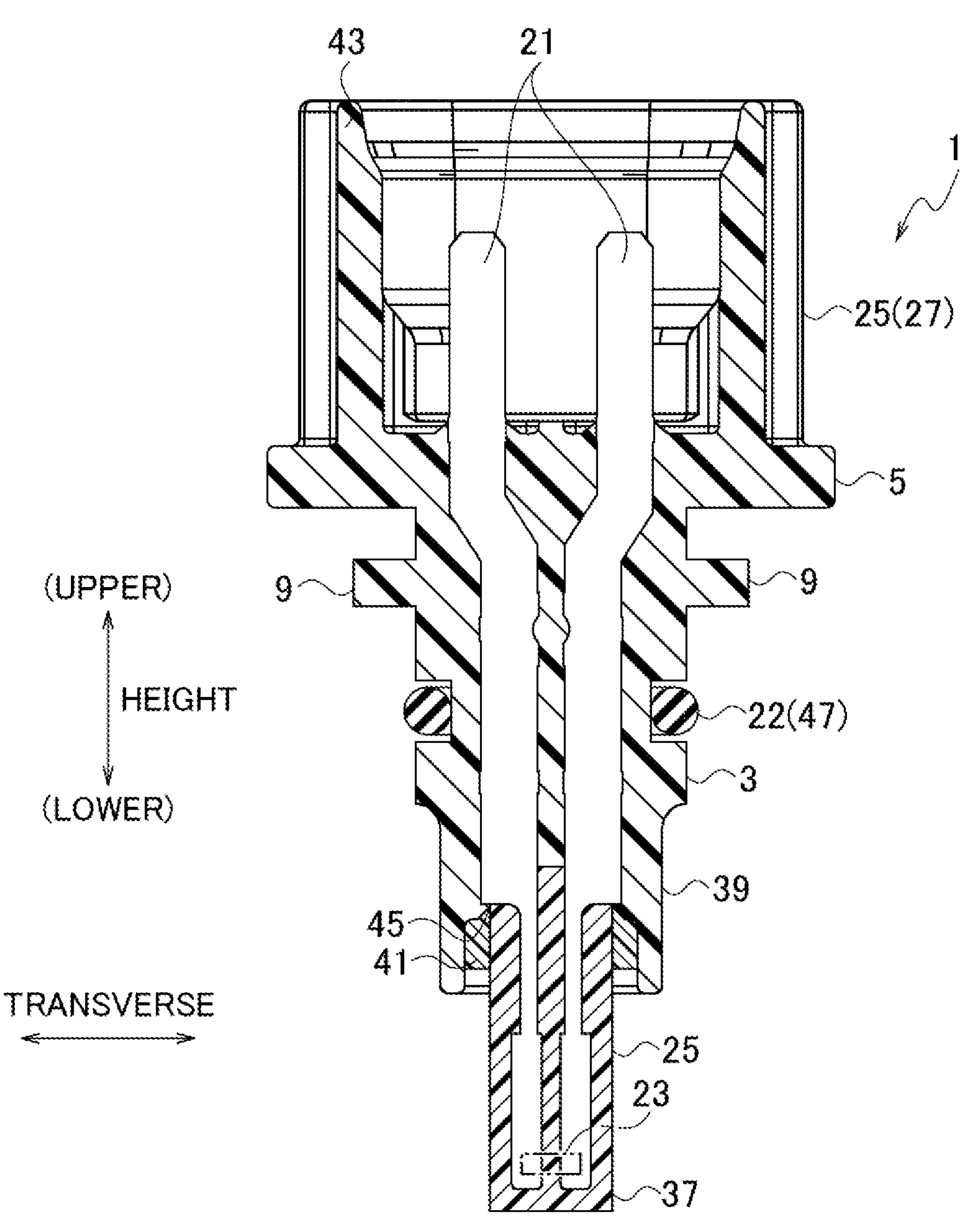
FIG. 6 is a view illustrating a VI-VI section of FIG. 2.

As illustrated in FIG. 6, the temperature sensor 1 includes lead frames 21, a thermistor 23 provided with the lead frames 21, and a resin body 25. The resin body 25 covers a part of the lead frames 21 and the thermistor 23. The resin body 25 is integrated with the lead frames 21 and the thermistor 23.

The resin body 25 includes a resin main body 27, an abutting part 5, a locked part 7, and a projection 9. The resin main body 27, the abutting part 5, the locked part 7 and the projection 9 are integrated. The insertion part 3 includes a part of the resin main body 27, a part of the lead frames 21, and the thermistor 23.

Figures 4, 5:
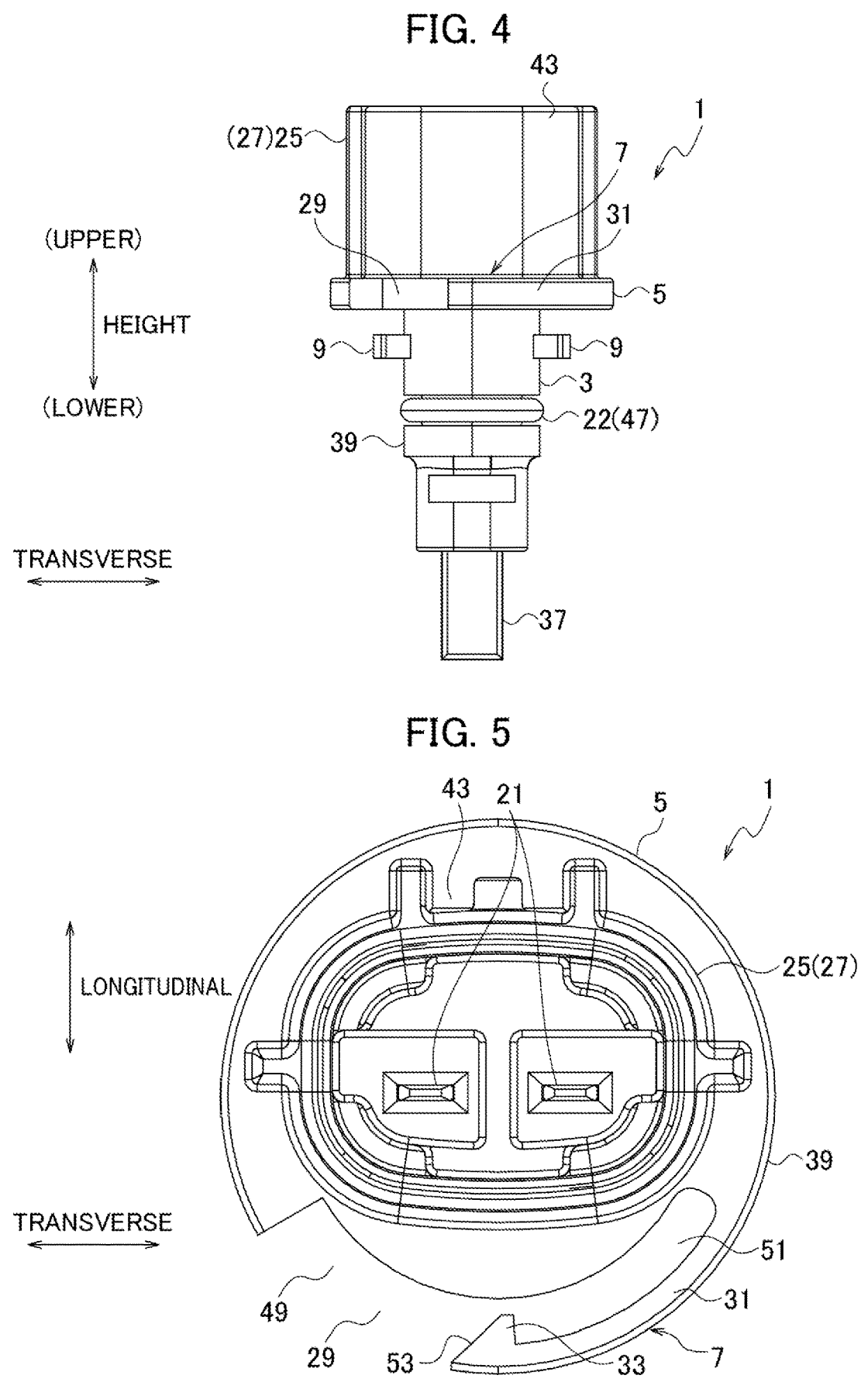

The locked part 7 of the temperature sensor 1 is formed by a cutout 29 provided in the abutting part 5 as illustrated in FIG. 5 and the like. The locked part 7 includes an elastic arm 31 in a form of a cantilever with long extension and elasticity, and a locked projection 33 provided at a tip of the elastic arm 31. The elastic arm 31 extends along an outer periphery of the abutting part 5 in an arc shape, for example.

In a state in which the temperature sensor 1 is in the process of being rotated with respect to the attachment partner 11, after the insertion part 3 is completely inserted into the attachment partner 11 (see FIG. 15), the locked projection 33 abuts the locking projection 17 of the attachment partner 11, so that the elastic arm 31 is elastically deformed.

Figure 14:
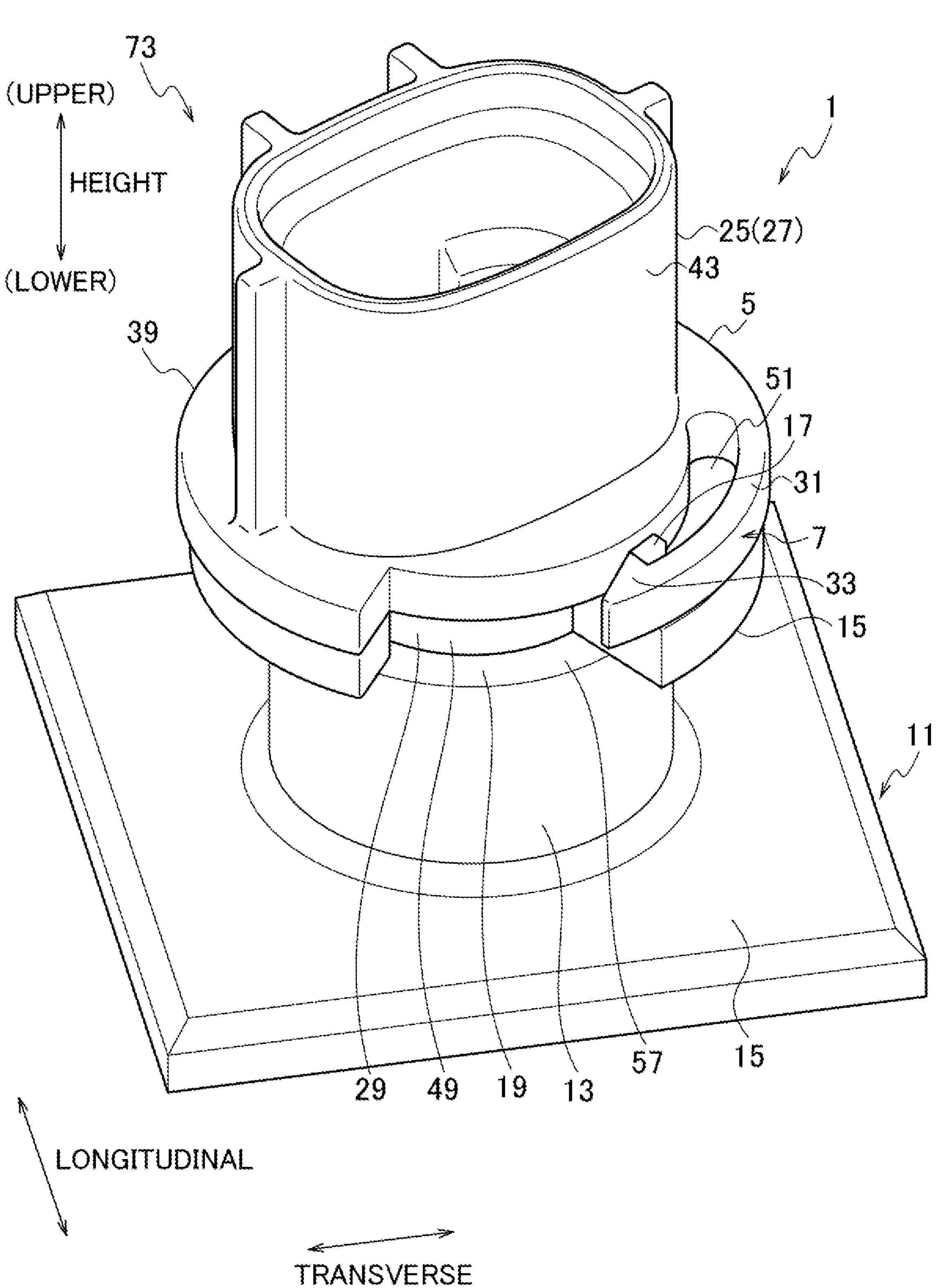
FIG. 14 is a perspective view of the sensor attachment structure according to the embodiment, illustrating a state of the temperature sensor completely mounted on the attachment partner.
Figure 16:
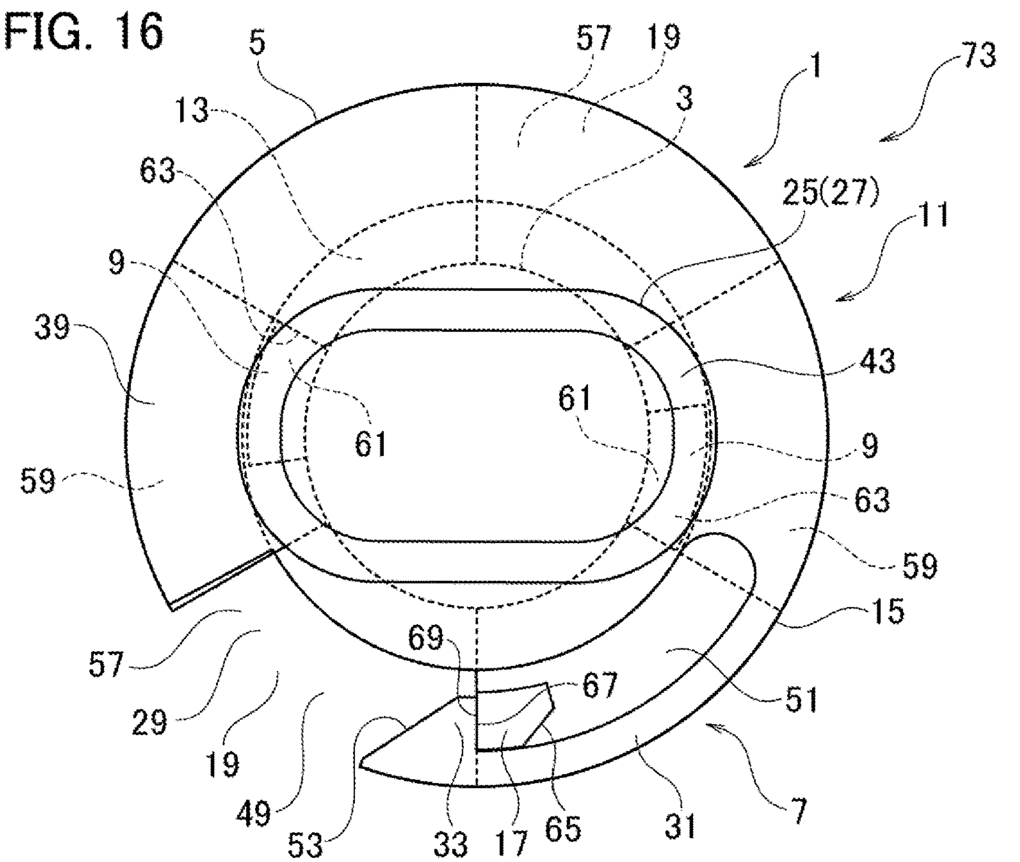
FIG. 16 is a plan view of the sensor attachment structure according to the embodiment, illustrating a state of the temperature sensor completely mounted on the attachment partner.
Figure 17:
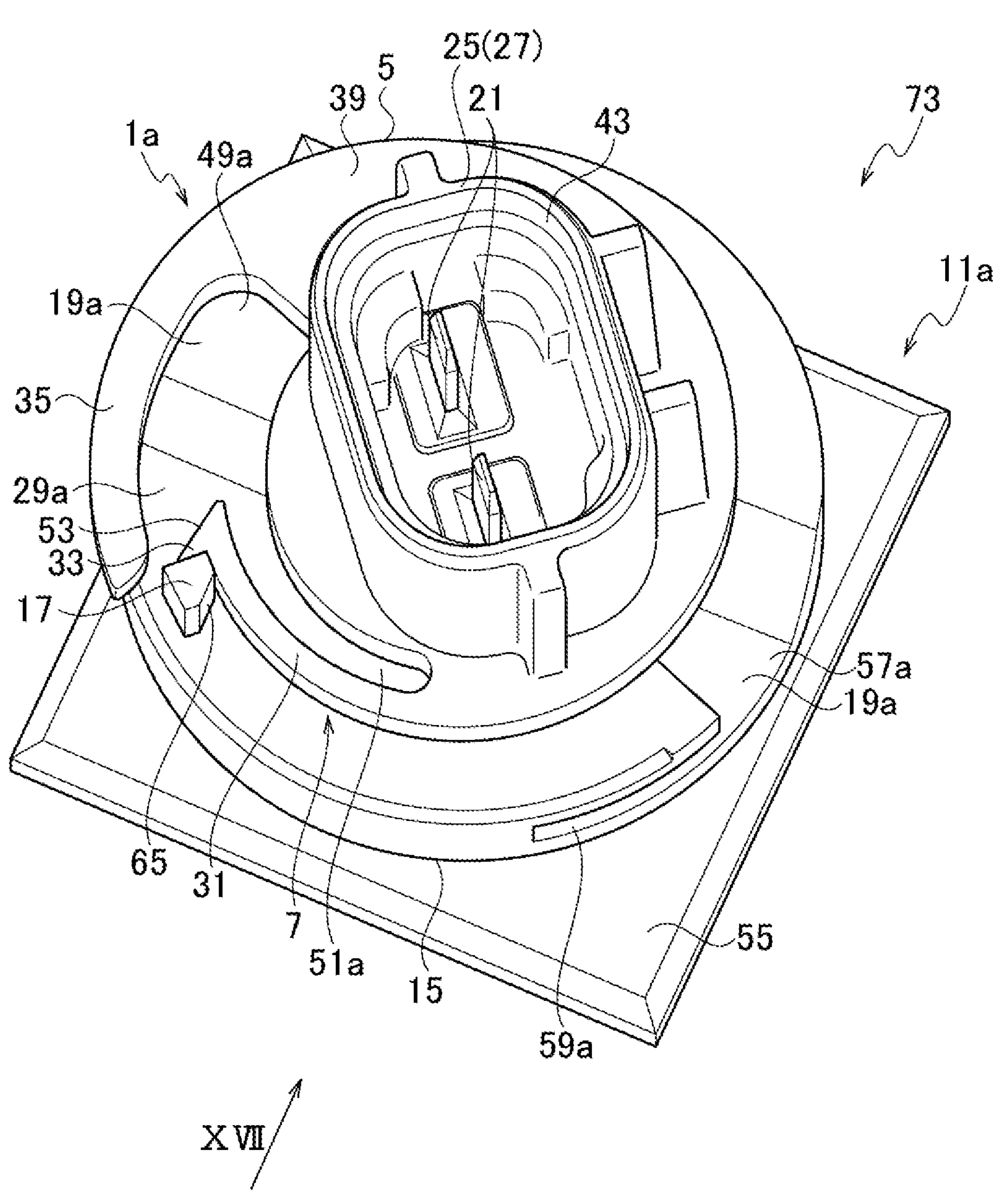
FIG. 17 is a perspective view of a sensor attachment structure according to a first modification, illustrating a state of a temperature sensor completely mounted on an attachment partner.
Figure 18:
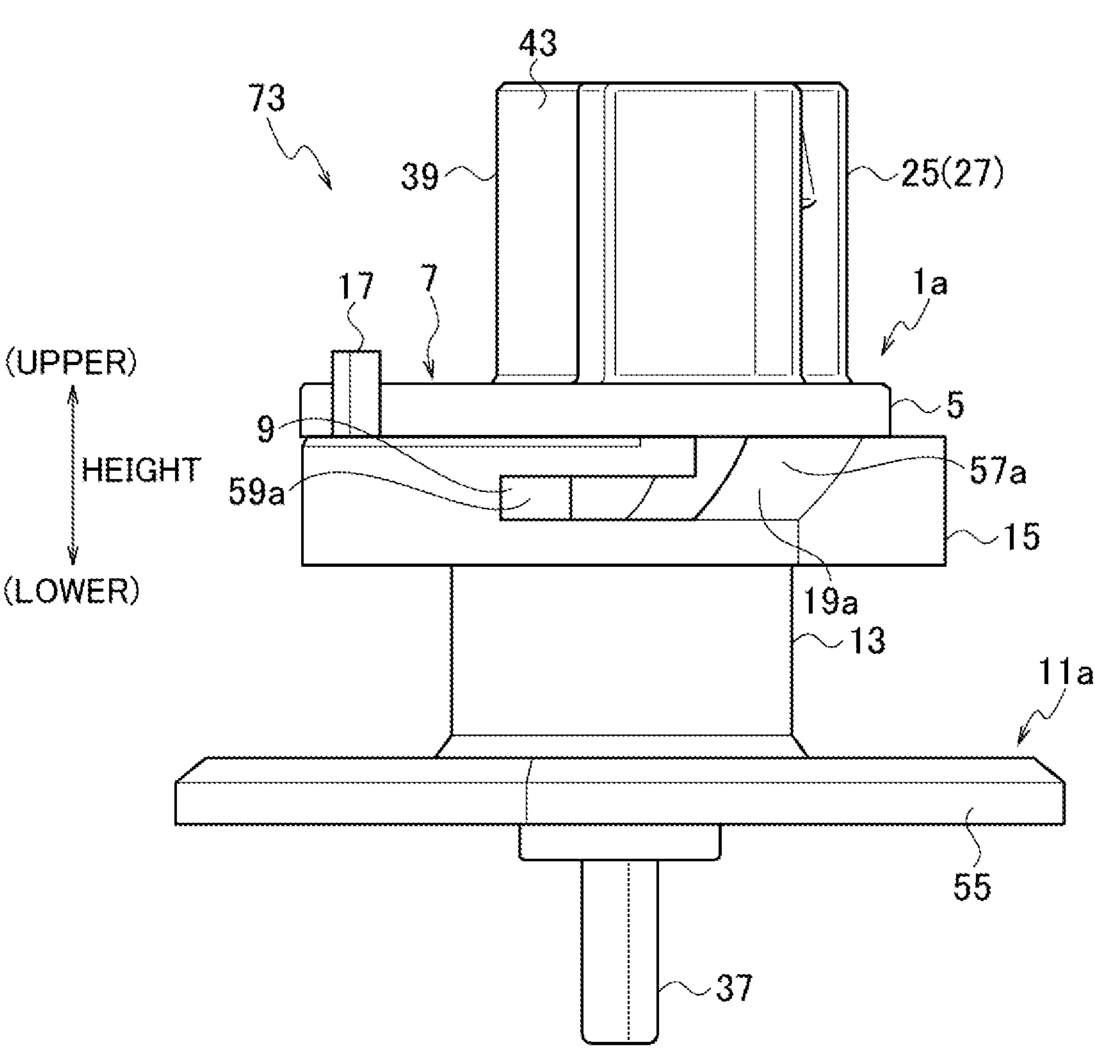
FIG. 18 is an XVII arrow view in FIG. 17.

The elastic arm 31 is restored when the temperature sensor 1 is completely attached to the attachment partner 11 (see FIGS. 1, 14 and 16), so that the locked part 7 is locked with the locking projection 17 of the attachment partner 11.

As illustrated in FIG. 5, the locked projection 33 is provided at the tip of the elastic arm 31 and projects from the elastic arm 31 toward a center side (inside) of the abutting part 5. In an aspect in which the locked projection 33 projects toward inside, the elastic arm 31 elastically deforms outward in the process of mounting the temperature sensor 1 on the attachment partner 11.

Figure 21:
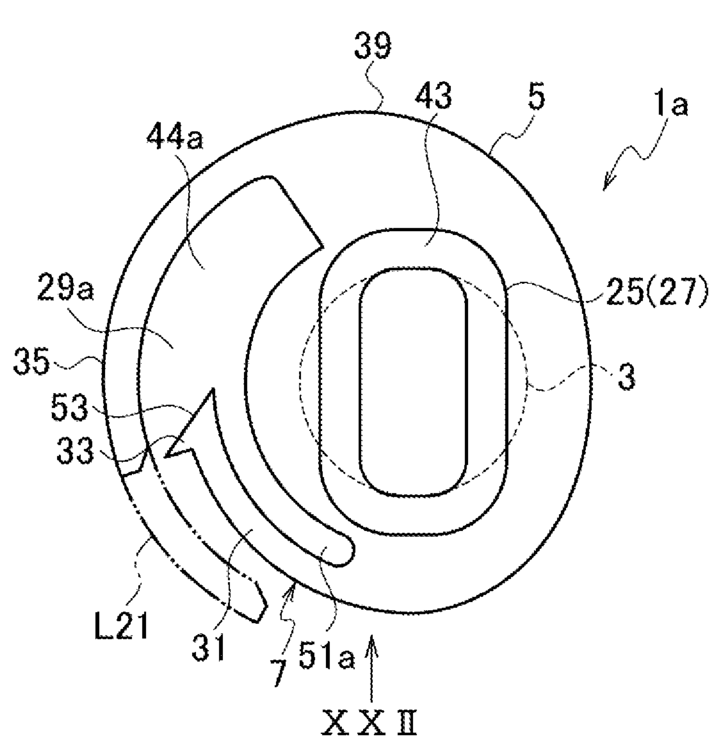
FIG. 21 is a plan view of the temperature sensor according to the first modification.
Figure 22:
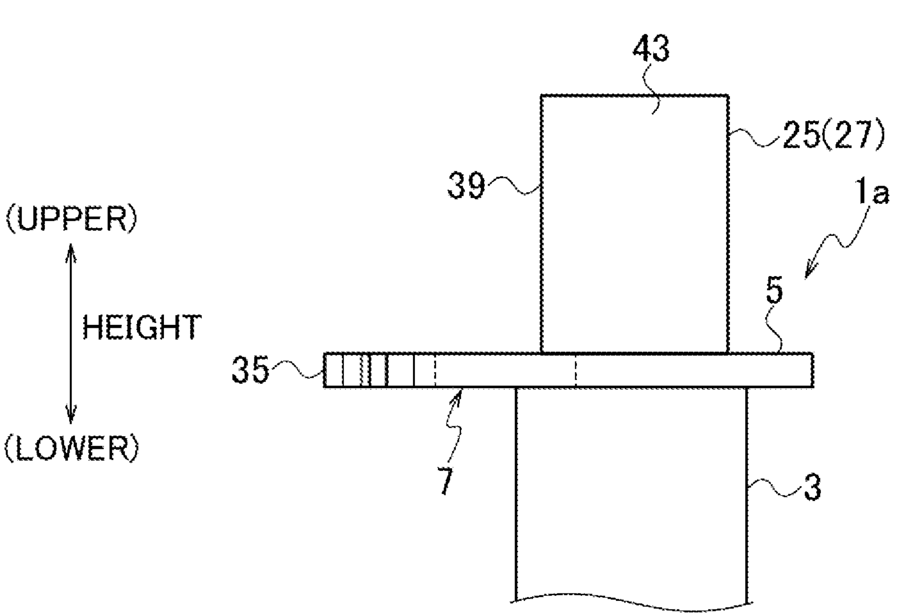
FIG. 22 is a XXII arrow view in FIG. 21.
Figure 23:
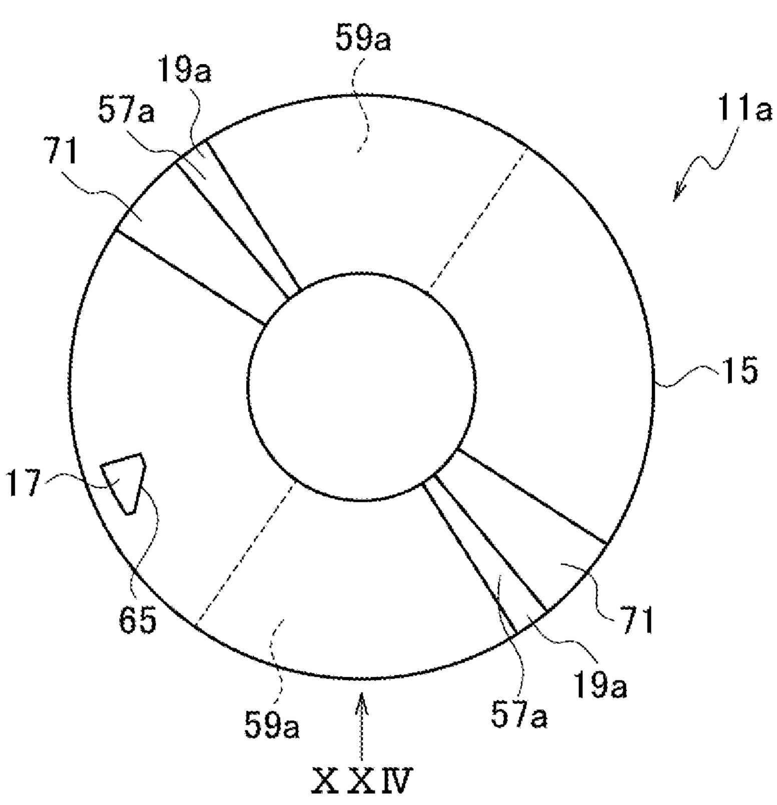
FIG. 23 is a plan view of the sensor attachment structure according to the first modification.
Figure 24:
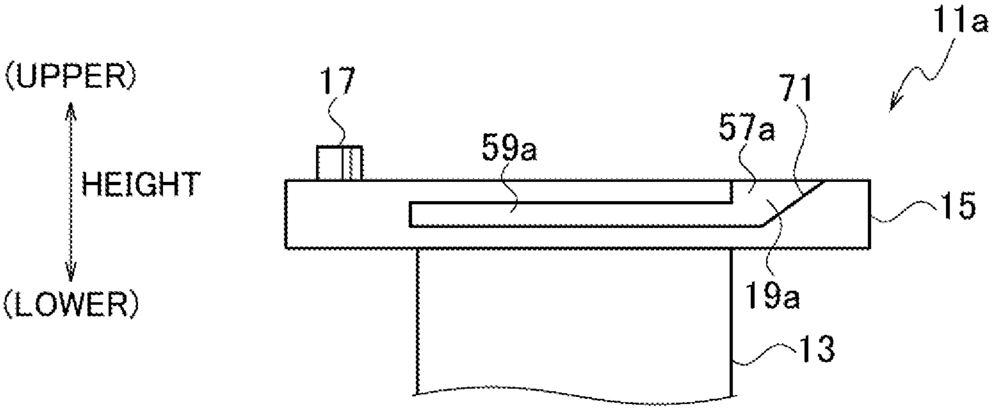
FIG. 24 is a XXIV arrow view in FIG. 23.

As illustrated in FIG. 21 and the like, the locked projection 33 may be provided at the tip of the elastic arm 31, and project from the elastic arm 31 toward an opposite side (outside) to the center side of the abutting part 5. In an aspect in which the locked projection 33 projects toward outside, the elastic arm 31 is elastically deformed inward in a state in which the temperature sensor 1 is on the process of being mounted on the attachment partner 11.

In the temperature sensor 1, a locked part protector 35 may be formed by the cutout 29 provided in the abutting part 5, as illustrated in FIG. 21 and the like. The locked part protector 35 protects the locked part 7 (the locked projection 33 of the locked part 7). The temperature sensor 1 and the attachment partner 11 will be described in more detail with reference to FIGS. 1 to 12.

Figure 7:
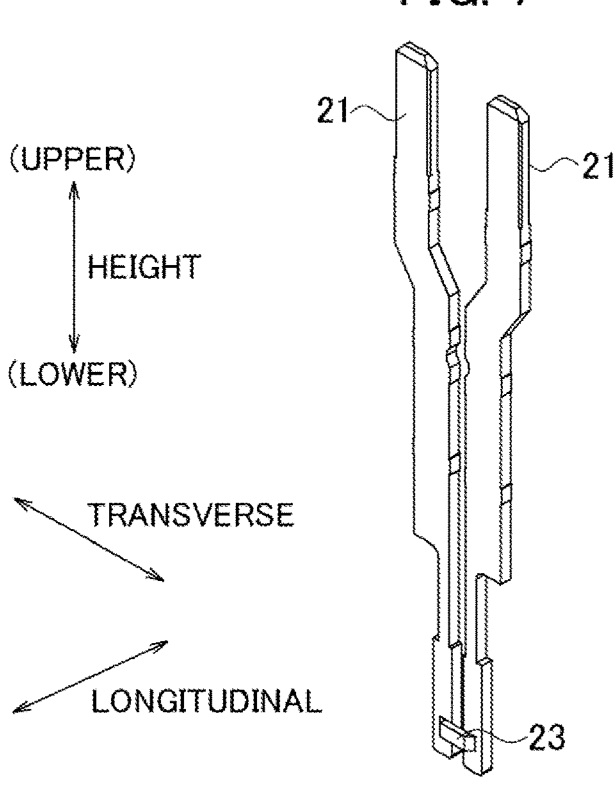
FIG. 7 is a view illustrating a manufacturing process of the temperature sensor according to the embodiment.
Figure 8:
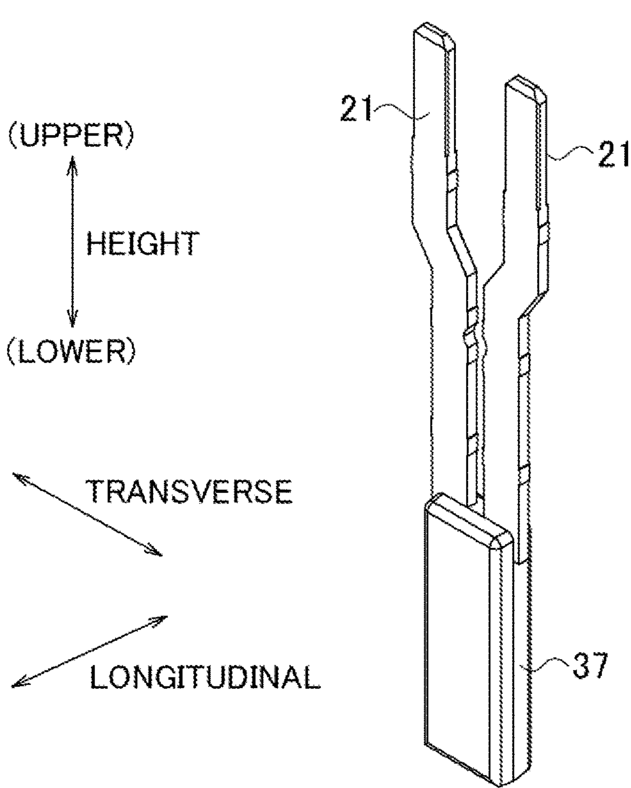
FIG. 8 is a view illustrating a manufacturing process of the temperature sensor according to the embodiment.

As described above, the temperature sensor 1 includes the lead frames 21, the thermistor 23, and the resin body 25. A pair of lead frames 21 is provided, which are aligned slightly apart from each other in the lateral direction as illustrated in FIGS. 6 and 7. The lead frames 21 extend long in the height direction.

The thermistors 23 are provided on the pair of lead frames 21 at the lower end of the pair of lead frames 21.

The resin body 25 includes a first resin part 37, a second resin part 39, and a potting agent 41 (see FIG. 6). The second resin part 39 is provided with the abutting part 5, the locked part 7, and the projection 9. A portion below the abutting part 5 of the temperature sensor 1 in the height direction constitutes the insertion part 3.

A cylindrical part 43 is formed on an upper side of the abutting part 5. The cylindrical part 43 is also formed by the second resin part 39. Within the cylindrical part 43, an upper end of each of the lead frames 21 is exposed. The cylindrical part 43 is used to connect the temperature sensor 1 to a connector (not illustrated).

The first resin part 37 is made of a resin having high thermal conductivity and covers the thermistor 23 and a lower portion of each of the lead frames 21 on which the thermistor 23 is placed, as illustrated in FIG. 6 and the like. The second resin part 39 is provided on the first resin part 37 and the lead frames 21 so that the first resin part 37 projects from a lower end thereof. An outer diameter (dimensional values in vertical and horizontal directions) of the first resin part 37 is smaller than an outer diameter of the insertion part 3.

Most of the second resin part 39 is positioned above the first resin part 37. An interface 45 (see FIG. 6) between the first resin part 37 and the second resin part 39 formed at a lower end of the second resin part 39 (an upper end of the first resin part 37) is sealed by the potting agent 41.

A portion of the resin main body 27 constituting the insertion part 3 is formed in a columnar shape (for example, substantially cylindrical shape). An annular groove 47 is provided on an outer periphery of the portion of the resin main body 27 constituting the insertion part 3, and an annular sealing material (for example, an O-ring) 22 having elasticity is placed in the groove 47. The groove 47 is located in a middle portion of the insertion part 3 in the height direction.

The abutting part 5 is formed in a shape of a disk having a predetermined thickness. The abutting part 5 is provided on an upper side of the insertion part 3 so that the thickness direction corresponds to the height direction. When viewed in the height direction, the outer diameter of 5 is larger than the outer diameter of the insertion part 3, and a center of the abutting part 5 and a center of the insertion part 3 correspond to each other.

As described above, the locked part 7 is formed by the cutout 29 formed in the abutting part 5. The cutout 29 penetrates the abutting part 5 in the thickness direction. The locked part 7 is formed as a part of the abutting part 5. As illustrated in FIG. 5 and the like, the cutout 29 is formed by a first portion 49 and a second portion 51 connected to the first portion 49. The first portion 49 and the second portion 51 are formed in an arc shape. A center of these arcs corresponds to the center of the disc-shaped abutting part 5.

A width of the first portion 49 (a radial dimension of the disc-shaped abutting part 5) is wider than a width of the second portion 51. The second portion 51 extends in an arc shape from one end of an arc of the arc-shaped first portion 49. It can be said that the first portion 49 and the second portion 51 are formed in a substantially sectorial shape. The details of the substantially sectorial shape will be described below.

The first portion 49 is recessed from the outer periphery of the abutting part 5 toward the center side of the abutting part 5. The second portion 51 is positioned in a middle part (middle part of the outer periphery) of the abutting part 5 in a radial direction so that the locked portion 7 is formed, extending in a radial direction of the abutting part 5. The elastic arm portion 31 of the locked part 7 and the locked projection 33 are formed mainly by the second portion 51.

A bottom surface of the first portion 49 (an arc-shaped surface on the center side of the abutting part 5) and a bottom surface of the second portion 51 are smoothly connected, so that the bottom surface of the first portion 49 and the bottom surface of the second portion 51 form a single arc when viewed in the height direction.

The elastic arm 31 is formed in a shape of an arc having a predetermined width when viewed in the height direction. The locked projection 33 is formed in a triangular shape when viewed in the height direction, and projects toward the center side of the abutting part 5 at the tip of the elastic arm 31. The locked projection 33 is formed in the triangular shape, so that an inclined surface 53 is formed on the locked projection 33.

Although the cutout 29 is formed, when viewed in the height direction, the cylindrical part 43, the insertion part 3, and the projection 9 fit inside the abutting part 5.

The projection 9 is formed in a substantially sectorial shape with a predetermined thickness. For a substantially sectorial shape, a line segment with a predetermined length is drawn on a single plane. The line segment is rotated by a predetermined angle (for example, an acute angle) around a predetermined single point existing on the single plane. At this time, the shape is represented by a locus of the single line segment. It should be noted that the predetermined single point exists on an extension line of the line segment apart from the line segment.

The projection 9 projects from the insertion part 3 so that the thickness direction corresponds to the height direction. More specifically, a center of an arc of the projection 9 corresponds to a center of the insertion part 3 (abutting part 5), for example, when viewed in the height direction. Also, when viewed in the height direction, a short concave arc of two arcs of the projection 9 is in contact with the insertion part 3, and a long convex arc of the two arcs of the projection 9 is separated from the insertion part 3.

The projection 9 is positioned between the abutting part 5 and the groove 47 in the height direction. The projection 9 is provided in a pair, and each projection 9 of the pair of projections 9 is positioned in a position point-symmetrical to the center of the insertion part 3 (abutting part 5) in the height direction.

As illustrated in FIGS. 9 to 12, the attachment partner 11 includes an attachment partner body 55, a cylindrical part 13, a flange 15, and a locking projection 17. The flange 15 is provided with the cutouts 19. The attachment partner body 55 illustrated in FIG. 9 and the like is formed in a rectangular plate-like shape for the convenience of explanation, but in practice, the attachment partner body 55 is formed in a shape of a housing in which an LLC and the like is placed.

The cylindrical part 13 is formed in a cylindrical shape, for example, and projects upward from the attachment partner body 55. A central axis of a cylinder of the cylindrical part 13 extends in the height direction. The flange 15 is formed in a shape of a disk with a predetermined thickness and is provided on an upper side of the cylindrical part 13 so that the thickness direction corresponds to the height direction. An outer diameter of the flange 15 is larger than an outer diameter of the cylindrical part 13.

When viewed in the height direction, a central axis of the flange 15 and the central axis of the cylindrical part 13 correspond to each other. A circular through-hole is formed in a center of the flange 15, and an outer periphery of the through-hole in the center of the flange 15 and an outer periphery of an inner space of the cylindrical part 13 overlap each other.

Each of the cutouts 19 is formed of a first portion 57 and a second portion 59 connected to the first portion 57. The first portion 57 and the second portion 59 are formed in a substantially sectorial shape. A center of these substantially sectorial arcs correspond to a center of the cylindrical part 13.

The first portion 57 penetrates the flange portion 15 with a thickness thereof. The second portion 59 does not penetrate the flange portion 15 with a thickness thereof. The second portion 59 is recessed upward from a lower surface of the flange 15. As a result, a thickness of a portion of the flange 15 on which the second portion 59 is formed is smaller than a thickness of a portion of the flange 15 on which the first portion 57 and the second portion 59 are not formed.

Further, the abutting surface 61 and the abutting surface 63 on which the projections 9 provided in the insertion part 3 of the temperature sensor 1 abut are formed by the cutouts 19 being provided. A pair of cutouts 19 are provided in accordance with a pair of projections 9 being provided, and each of the cutouts 19 is arranged in a position point-symmetrical to the center of the cylindrical part 13 when viewed in the height direction.

The locking projection 17 is formed in a small cuboid-like shape having a slope 65 (see FIG. 12) being formed, and projects upward from an upper surface of the abutting part 5. In the height direction, the locking projection 17 is adjacent to the first portion 57 of the cutout 19.

With reference to FIGS. 13 to 16, mounting operation of the temperature sensor 1 on the attachment partner 11 will be described. The temperature sensor 1 is integrally mounted on the attachment partner 11 using a so-called snap fit.

Figure 13:
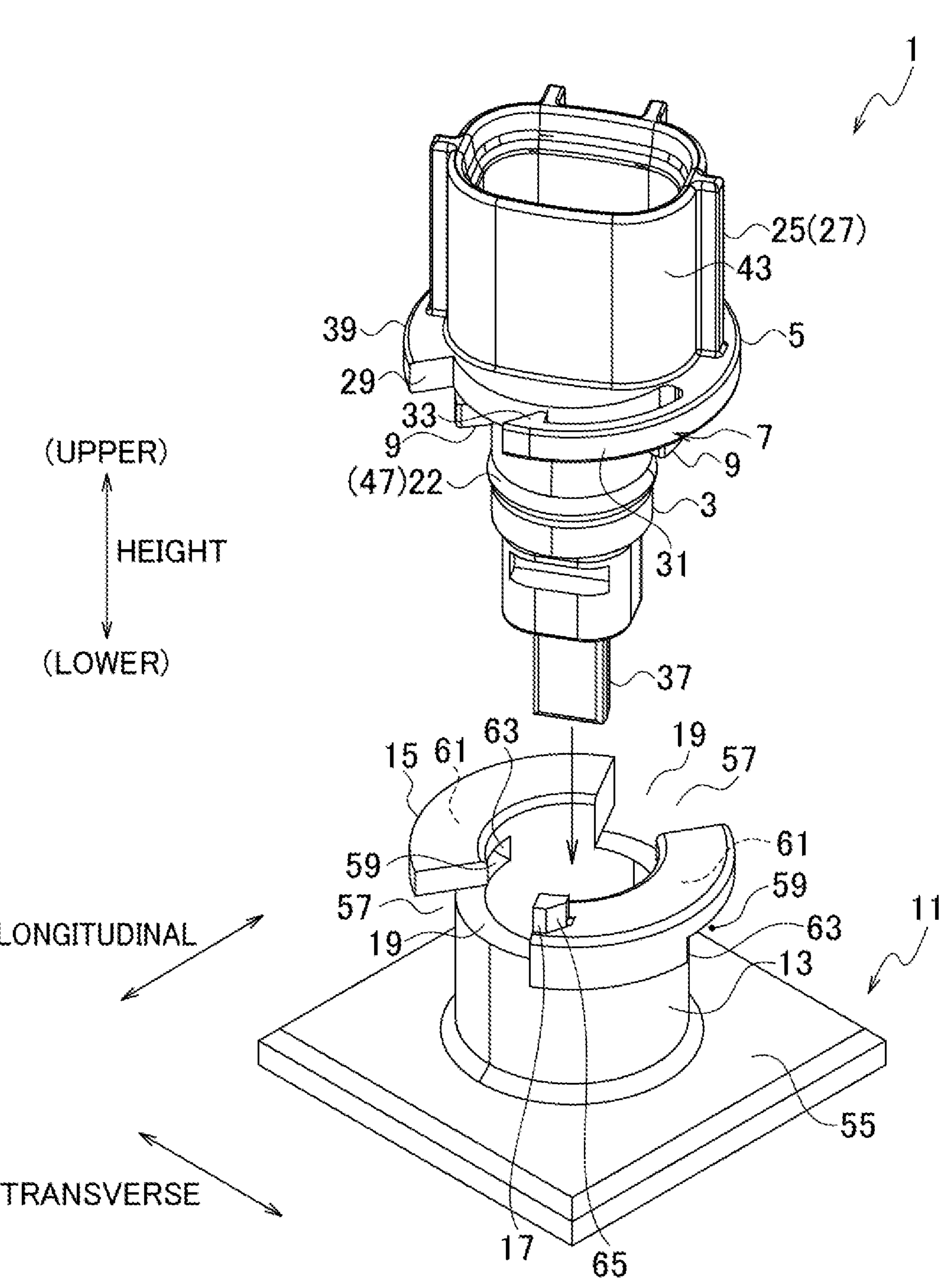
FIG. 13 is a perspective view of the sensor attachment structure according to the embodiment, illustrating an initial state when the temperature sensor is mounted on the attachment partner.
Figure 15:
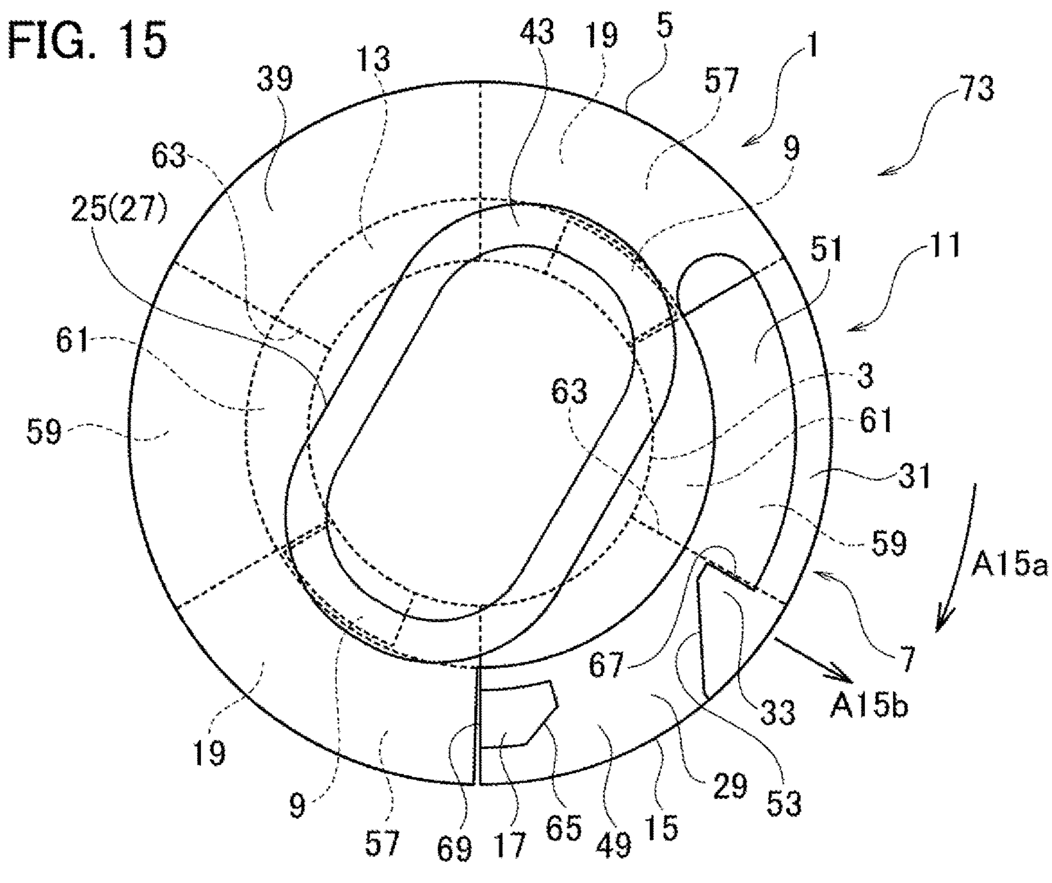
FIG. 15 is a plan view of the sensor attachment structure according to the embodiment, illustrating a state of the temperature sensor in the process of being mounted on the attachment partner.

In an initial state, as illustrated in FIG. 13, the temperature sensor 1 on which the O-ring 22 is arranged is separated from the attachment partner 11 on an upper side of the attachment partner 11. When the initial state is viewed in the height direction, as illustrated in FIG. 15, a central axis of the temperature sensor 1 and a central axis of the attachment partner 11 correspond to each other. Further, FIG. 15 is a plan view in which the insertion part 3 of the temperature sensor 1 is completely inserted into the attachment partner 11, but FIG. 15 can also be viewed as a plan view in the state illustrated in FIG. 13.

When the initial state is viewed in the height direction, as illustrated in FIG. 15, the locking projection 17 and the locked part 7 are separated from each other, and the projection 9 is located at the first portion 57 of the cutout 19.

In the initial state, the temperature sensor 1 is moved downward relative to the attachment partner 11 until the abutting part 5 abuts the flange 15 of the attachment partner 11.

Thereafter, the temperature sensor 1 is rotated by a predetermined angle with respect to the attachment partner 11 with the central axis of the temperature sensor 1 (insertion part 3, cylindrical part 13) as a central axis of rotation so that the mounting of the temperature sensor 1 on the attachment partner 11 is completed.

More specifically, the temperature sensor 1 is rotated in a direction of an arrow A15*a* with respect to the attachment partner 11 from a state in which the insertion part 3 of the temperature sensor 1 illustrated in FIG. 15 is completely inserted into the attachment partner 11. Then, an inclined surface 53 of the locked portion 7 abuts the slope 65 of the locking projection 17, and the elastic arm 31 bends outward (in the direction of the arrow A15*b*).

The temperature sensor 1 is further rotated in the direction of the arrow A15*a* with respect to the attachment partner 11. Then, the locked projection 33 of the locked part 7 overcomes the locking projection 17, and the elastic arm 31 is restored. Thus, mounting of the temperature sensor 1 on the attachment partner 11 is completed (see FIG. 1, FIG. 14 and FIG. 16).

In a state in which the temperature sensor 1 is completely mounted on the attachment partner 11, the projection 9 is abutting the abutting surface 61 of the cutout 19. Thus, the abutting part 5 and the projection 9 clamp the flange 15 of the attachment partner 11 in the height direction.

In the state in which the temperature sensor 1 is completely mounted on the attachment partner 11, the projection 9 abuts the abutting surface 63 of the cutout 19, and an abutting surface 67 of the locked projection 33 abuts an abutting surface 69 of the locking projection 17 (see FIG. 6). Thus, the locked projection 33 and the projection 9 clamp the flange 15 of the attachment partner 11 in a circumferential direction of the temperature sensor 1 (abutting part 5).

When the temperature sensor 1 mounted on the attachment partner 11 is removed from the attachment partner 11, the elastic arm 31 is elastically deformed toward the outside. Then, the locked projection 33 is separated from the locking projection 17, and the temperature sensor 1 is rotated with respect to the attachment partner 11 in a direction opposite to the arrow A15*a* illustrated in FIG. 15.

The temperature sensor 1 includes the insertion part 3, the abutting part 5, the locked part 7, and the projection 9. The insertion part 3 is inserted into the cylindrical part 13 of the attachment partner 11 when attachment of the temperature sensor 1 to the attachment partner 11 is conducted. The abutting part 5 abuts the flange 15 of the attachment partner 11 when the insertion part 3 is completely inserted into the cylindrical part 13 of the attachment partner 11.

The locked part 7 is locked with the locking projection 17 of the attachment partner 11 when the insertion part 3 is completely inserted into the attachment partner 11 and then completely mounted on the attachment partner 11 by turning a predetermined angle with respect to the attachment partner 11.

When the temperature sensor 1 is completely attached to the attachment partner 11, the projection 9 enters the cutout 19 of the attachment partner 11. The projection 9 clamps the flange 15 of the attachment partner 11 together with the abutting part 5 in the thickness direction of the flange 15. The projection 9 clamps the flange 15 of the attachment partner 11 together with the locked part 7 in the circumferential direction of the flange 15.

Thus, when the temperature sensor 1 is mounted on the attachment partner 11, it is not necessary to turn the temperature sensor 1 many times (for example, a plurality of turnings of 360 degrees or more), and torque management is not required, and workability is improved when the temperature sensor 1 is mounted on the attachment partner 11. That is, the temperature sensor 1 can be attached to the attachment partner 11 with one touch. The temperature sensor 1 can be detached from the attachment partner 11 with one touch.

A rotation angle of the temperature sensor 1 that is completely mounted is not constant by mounting on the attachment partner with a screw part. On the other hand, in the temperature sensor 1, the rotation angle of the temperature sensor 1 that is completely mounted can be constant with respect to the attachment partner 11.

For example, when the temperature sensor 1 is completely mounted on the attachment partner 11, and even when the temperature sensor 1 is removed from the attachment partner 11 and mounted on the attachment partner 11 again, the rotation angle of the temperature sensor 1 around the central axis with respect to the attachment partner 11 is prevented from being changed.

Further, the temperature sensor 1 clamps the attachment partner 11 in two directions as described above, so that the temperature sensor 1 is prevented from rotating and tilting with respect to the attachment partner 11 around an axis extending in the longitudinal direction, and is prevented from rotating and tilting around an axis extending in the transverse direction.

In addition, by observing an engaged state between the locked part 7 of the temperature sensor 1 and the locking projection 17 of the attachment partner 11, it can be seen at a glance that the temperature sensor 1 is fixed to the attachment partner 11.

In addition, the part of the temperature sensor 1 that is engaged with the attachment partner 11 when the temperature sensor 1 is mounted on the attachment partner 11 is composed of a synthetic resin rather than a metal, so that the temperature sensor 1 can be manufactured at a low cost.

Figure 28:
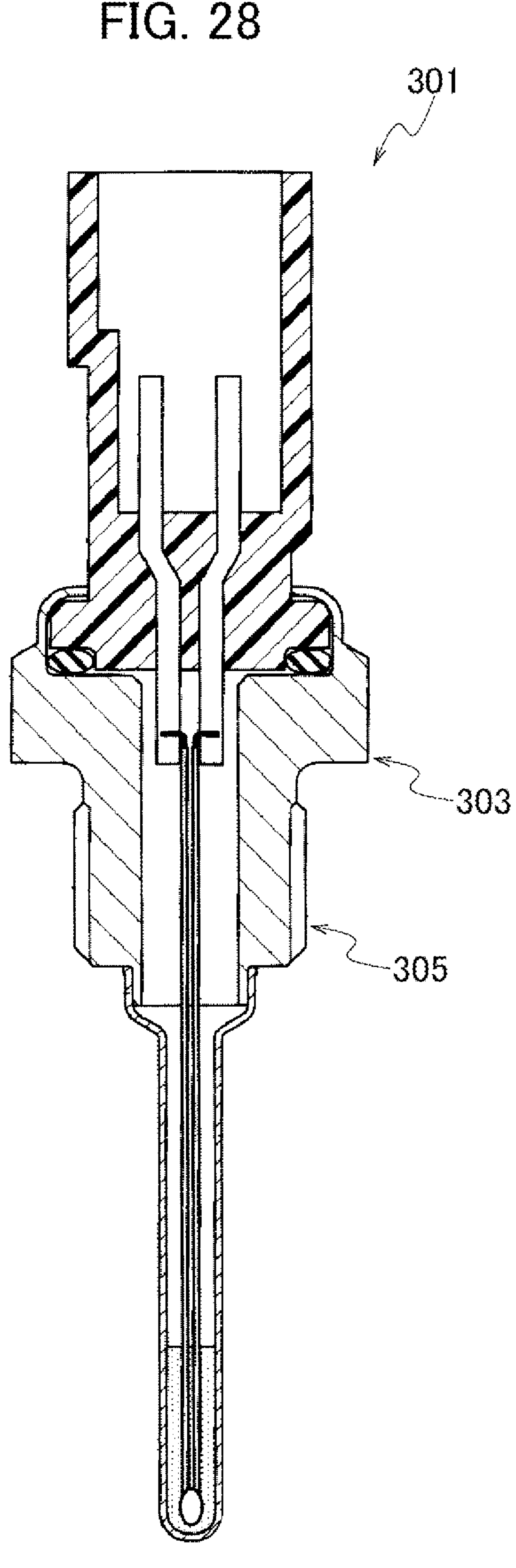
FIG. 28 is a diagram illustrating a temperature sensor according to a comparative example.

The temperature sensor 301 according to a comparative example will be described with reference to FIG. 28.

The temperature sensor 301 according to the comparative example has a metal housing 303 as an attachment part, and is mounted on and fixed to the attachment partner by fastening a male screw part 305 provided on the metal housing 303 to a female screw part of the attachment partner.

Since the temperature sensor 301 is mounted on the attachment partner by fastening a screw, it takes time to attach the temperature sensor 301 to the attachment partner. In addition, it is necessary to control a torque applied to the screw when the temperature sensor 301 is attached to the attachment partner, and the workability is not good when the temperature sensor is mounted on the attachment partner.

On the other hand, in the temperature sensor 1 according to the embodiment, the locked part 7 is formed by the cutout 29 provided in the abutting part 5. The locked part 7 includes the elastic arm 31 in a form of a cantilever with long extension and elasticity, and the locked projection 33 provided at the tip of the elastic arm 31.

Thereby, the elastic arm 31 is easily bent so that the temperature sensor 1 is more easily mounted on the attachment partner. Further, the locked part 7 is formed by the cutout 29 provided in the abutting part 5, so that projecting parts in the temperature sensor 1 can be minimized as much as possible, and the structure of the temperature sensor 1 is simplified.

First Modification

Next, a temperature sensor 1*a* and an attachment partner 11*a* according to a first modification will be described in detail with reference to FIGS. 17 to 25. Except for FIG. 18, a display of the projection 9 is omitted.

The temperature sensor 1*a* according to the first modification differs from the temperature sensor 1 with the locked projection 33 projecting inward (see FIG. 5 and the like) in that the locked projection 33 projecting outward, and the like, but in other respects, it has the same structure as the temperature sensor 1 illustrated in FIG. 5 and the like.

The abutting part 5 is formed in a shape of a disk having a predetermined thickness. The abutting part 5 is provided on an upper side of the insertion part 3 so that the thickness direction corresponds to the height direction. When viewed in the height direction, the outer diameter of the abutting part 5 is larger than the outer diameter of the insertion part 3. However, the center of the abutting part 5 is slightly shifted from the center of the insertion part 3.

As described above, the locked part 7 is formed by a cutout 29*a* formed in the abutting part 5. The cutout 29*a* penetrates the abutting part 5 in the thickness direction. The cutout 29*a* is formed of a first portion 49*a* and a second portion 51*a* connected to the first portion 49*a*. The first portion 49*a* and the second portion 51*a* are formed in an arc shape. The center of these arcs correspond to the center of the insertion part 3.

A width of the first portion 49*a* (a radial dimension of the abutting part 5 in the shape of a disc) is wider than a width of the second portion 51*a*. The second portion 51*a* extends from one end of the first portion 49*a* in an arc shape. The first portion 49*a* and the second portion 51*a* are also formed in a substantially sectorial shape.

The first portion 49*a* is positioned at an intermediate part (an intermediate part of an outer periphery) of the abutting part 5 in the radial direction of the abutting part 5 and extends in a circumferential direction of the abutting part 5 so that a locked part protector 35 is formed. The second portion 51*a* is positioned at the intermediate part (the intermediate part of the outer periphery) of the abutting part 5 in the radial direction of the abutting part 5 and extends in the circumferential direction of the abutting part 5 so that the locked part 7 is formed. The locked part protector 35 is formed mainly by the first portion 49*a*. The elastic arm 31 of the locked part 7 and the locked projection 33 are formed mainly by the second portion 51*a*.

A bottom surface of the first portion 49*a* (the arc-shaped surface on the center side of the abutting part 5) and a bottom surface of the second portion 51*a* are smoothly connected, so that the bottom surface of the first portion 49*a* and the bottom surface of the second portion 51*a* form a single arc when viewed in the height direction.

The elastic arm 31 is formed in a shape of an arc having a predetermined width when viewed in the height direction. The locked projection 33 is formed in a triangular shape when viewed in the height direction, and projects to an opposite side (outside) to the center of the abutting part 5 at the tip of the elastic arm 31. The locked projection 33 is formed in a triangular shape, so that an inclined surface 53 is formed on the locked projection 33.

The locked part protector 35 is also formed in a shape of an arc having a predetermined width when viewed in the height direction. A tip of the locked part protector 35 is positioned outside the locked projection 33 in the radial direction of the abutting part 5, and covers the locked projection 33 to protect the locked projection 33. As illustrated by a dash and double-dot line L21 in FIG. 21, an extension length of the locked part protector 35 may be increased to cover the elastic arm 31 in addition to the locked projection 33.

Figures 9, 10:
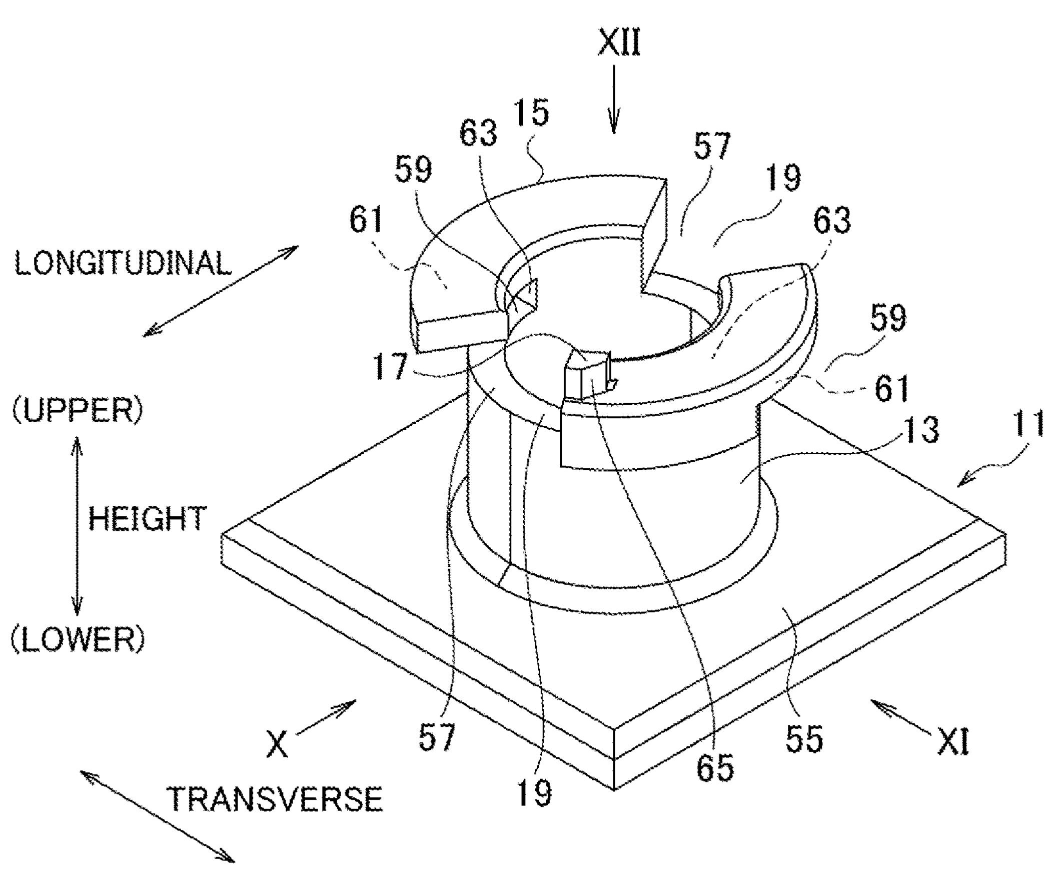
FIG. 9 is a perspective view illustrating an attachment partner of the sensor attachment structure according to the embodiment.
FIG. 10 is a X arrow view in FIG. 9.

The attachment partner 11*a* according to the first modification differs from the attachment partner 11 illustrated in FIG. 9 and the like in that each of cutouts 19*a* is provided only from an upper surface of the flange 15 to a middle part of the flange 15 in the height direction, and an inclined surface 71 is formed in each of the cutout 19*a*. In other respects, the attachment partner 11*a* has the same structure as the attachment partner 11 illustrated in FIG. 9 and the like. Each of the cutouts 19*a* includes a first portion 57*a* and a second portion 59*a*. The inclined surface 71 is formed at a corner of the first portion 57. This corner is a corner between a bottom surface of the first portion 57*a* and a side surface of the first portion 57*a* opposite to the second portion 59*a*.

The inclined surface 71 is formed, so that occurrence of a damage by the O-ring 22 is prevented as much as possible when the temperature sensor 1*a* on which the O-ring 22 is mounted is mounted on (inserted into) the attachment partner 11*a*, and the temperature sensor 1*a* is easily mounted on the attachment partner 11*a*.

Figure 19:
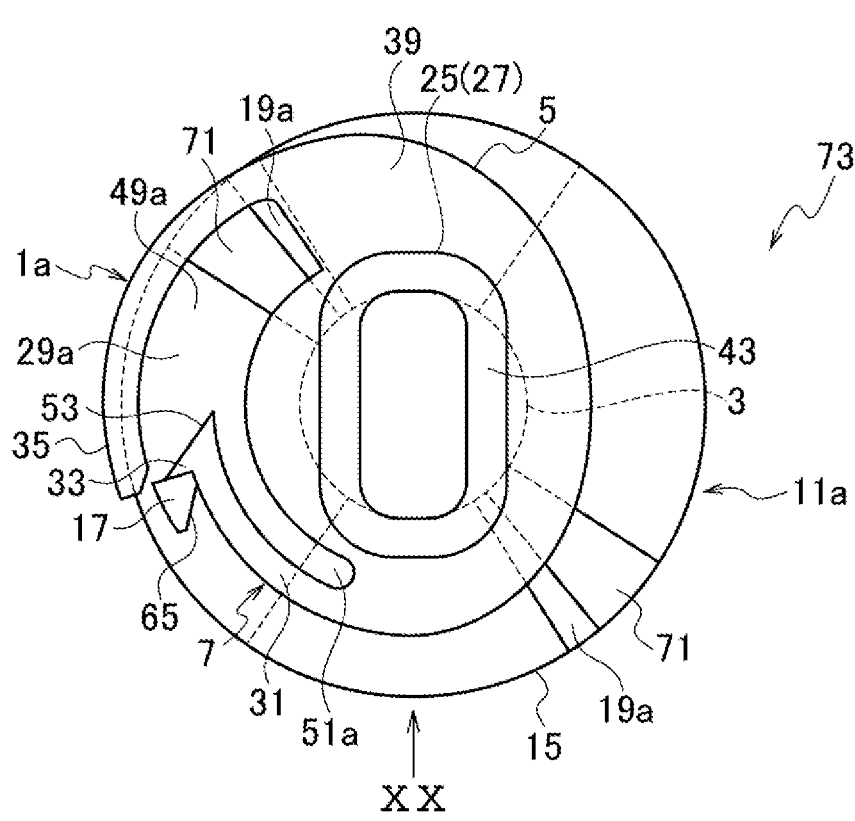
FIG. 19 is a perspective view of the sensor attachment structure according to the first modification, illustrating a state of the temperature sensor completely mounted on the attachment partner.
Figure 20:
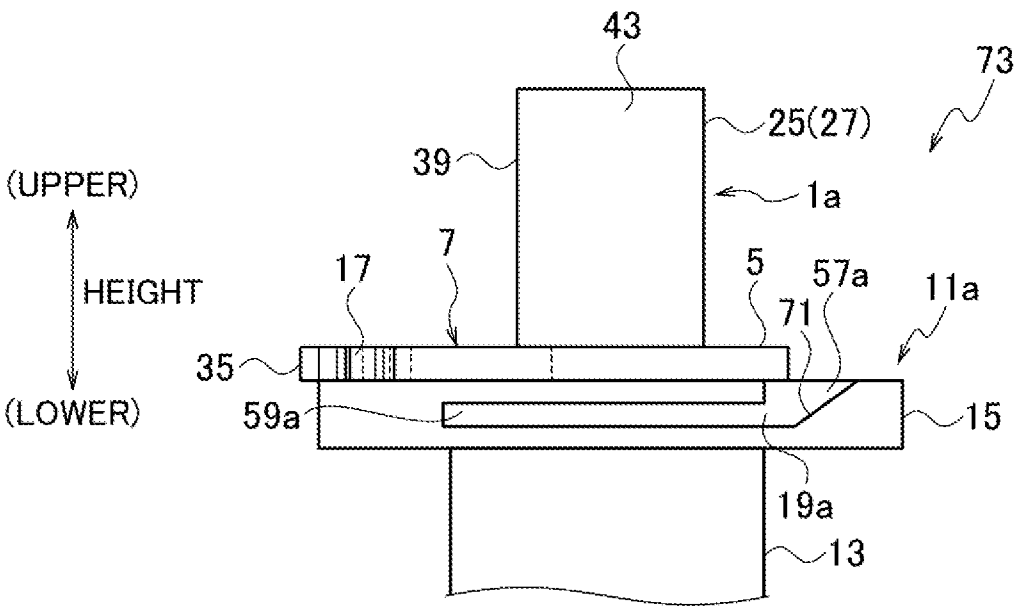
FIG. 20 is a XX arrow view in FIG. 19.
Figure 25:
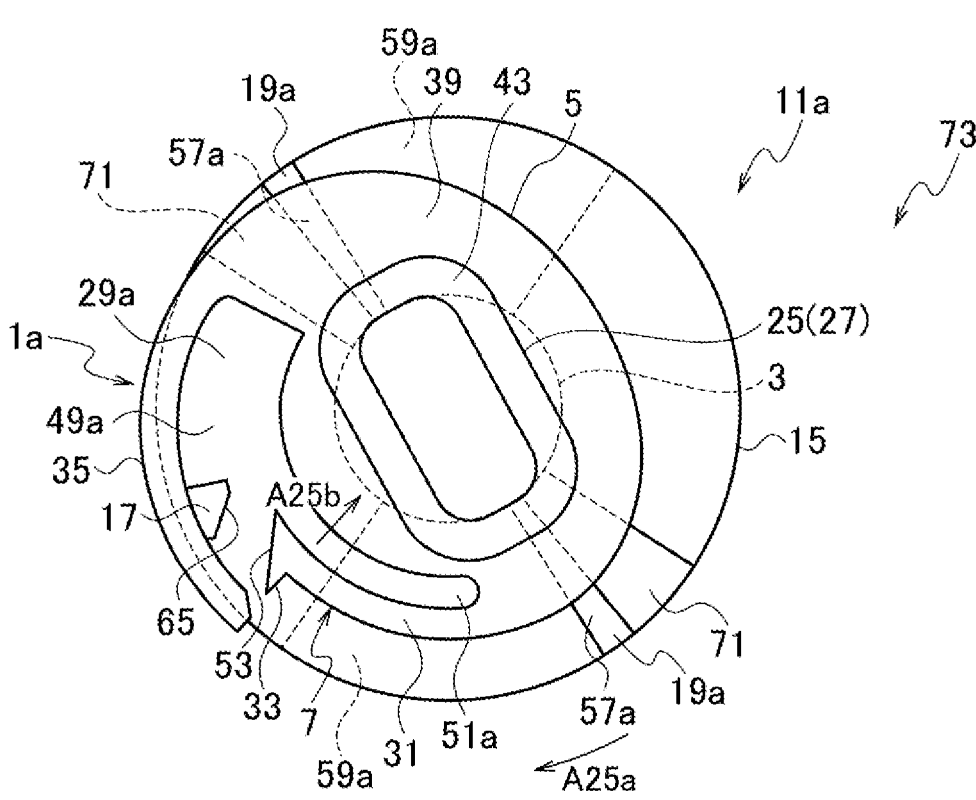
FIG. 25 is a plan view of the sensor attachment structure according to the first modification, illustrating a state of the temperature sensor in a process of being mounted on the attachment partner.

With reference to FIGS. 19 and 25, mounting operation of mounting the temperature sensor 1*a* on the attachment partner 11*a* will be described.

In an initial state, the temperature sensor 1*a* is separated from the attachment partner 11*a* on an upper side of the attachment partner 11*a*. When the initial state is viewed in the height direction, as illustrated in FIG. 25, the central axis of the insertion part 3 of the temperature sensor 1*a* and the central axis of the attachment partner 11*a* correspond to each other. When the initial state is viewed in the height direction, the locking projection 17 and the locked part 7 are separated from each other, and the locking projection 17 abuts a concave and arc-shaped inner surface of the locked part protector 35.

In the initial state, the temperature sensor 1*a* is moved to a lower side with respect to the attachment partner 11*a* in the same manner as in the case of the temperature sensor 1.

Thereafter, the temperature sensor 1*a* is rotated by a predetermined angle with respect to the attachment partner 11*a* with the central axis of the insertion part 3 and the cylindrical part 13 as a central axis of rotation, so that the mounting of the temperature sensor 1*a* on the attachment partner 11*a* is completed.

More specifically, the temperature sensor 1*a* is rotated in a direction of an arrow A25*a* with respect to the attachment partner 11*a* from a state illustrated in FIG. 25. As a result, the temperature sensor 1*a* is rotated with the locking projection 17 being as a sliding partner to the locked part protector 35. Thus, when the temperature sensor 1*a* is mounted on the attachment partner 11*a*, misalignment due to assembly can be prevented. Subsequently, the inclined surface 53 of the locked part 7 abuts the slope 65 of the locking projection 17, and the elastic arm 31 bends inward (in a direction of an arrow A25*b*).

The temperature sensor 1*a* is further rotated in the direction of arrow A25*a* with respect to the attachment partner 11. Then, the locked projection 33 of the locked part 7 overcomes the locking projection 17, and the elastic arm 31 is restored. Thus, the mounting of the temperature sensor 1*a* on the attachment partner 11*a* is completed (see FIG. 19).

In the temperature sensor 1*a*, the locked projection 33 projects outward. The elastic arm 31 elastically deforms inward in the process of mounting the temperature sensor 1*a* on the attachment partner 11. As a result, it is possible to avoid the possibility of the locked projection 33 being damaged by bumping into something as much as possible.

Furthermore, the locked part protector 35 is formed on the temperature sensor 1*a*, so that the breakage of the locked projection 33 and the like can be more reliably prevented.

Second Modification

Figure 26:
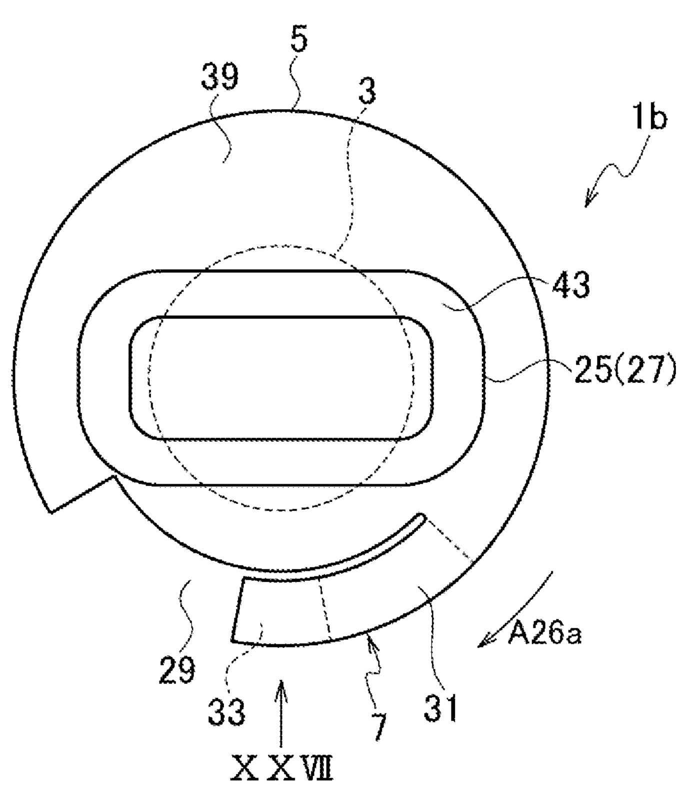
FIG. 26 is a plan view of a temperature sensor in a sensor attachment structure according to a second modification.
Figure 27:
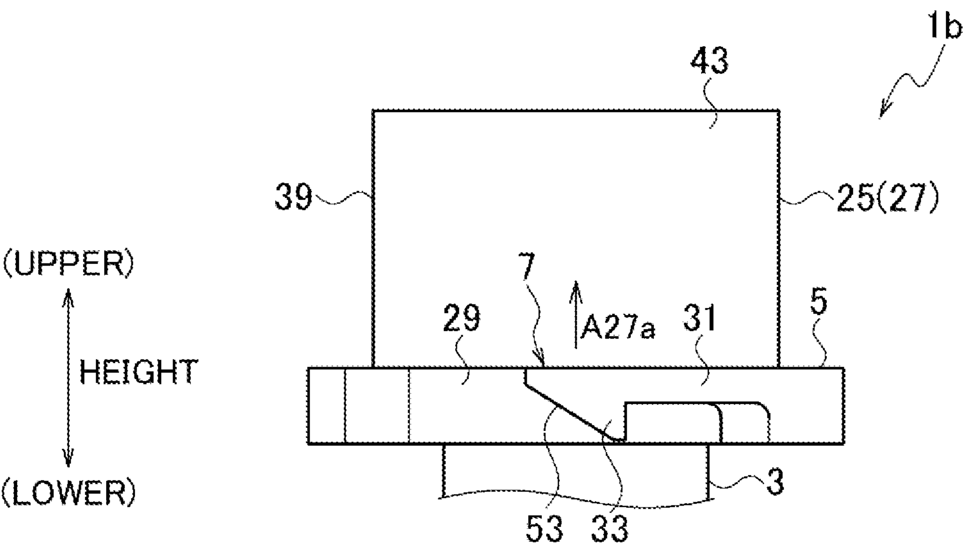
FIG. 27 is a XXVII arrow view in FIG. 26.

Next, a temperature sensor 1*b* according to a second modification will be described in detail with reference to FIGS. 26 and 27. In FIGS. 26 and 27, a display of the projection 9 is omitted.

The temperature sensor 1*b* according to the second modification differs from the temperature sensors 1 and 1*a* in that the elastic arm 31 bends upward rather than in the radial direction of the abutting part 5 in the process of mounting the temperature sensor 1*b* on an attachment partner, and in other respects, it has the same structure as the temperature sensors 1 and 1*a*.

More specifically, the temperature sensor 1*b* is rotated in a direction of an arrow A26*a* with respect to the attachment partner from a state illustrated in FIG. 26. Then, the inclined surface 53 of the locked part 7 abuts a slope of a locking projection of an attachment partner, and the elastic arm 31 is bent upward (in a direction of an arrow A27*a*). In FIGS. 26 and 27, a display of the attachment partner is omitted.

The temperature sensor 1*b* is further rotated in the direction of the arrow A26*a* with respect to the attachment partner. Then, the locked projection 33 of the locked part 7 overcomes the locking projection of the attachment partner, and the elastic arm 31 is restored. Thus, the mounting of the temperature sensor 1*b* on the attachment partner is completed.

The contents described above regarding the attachment partner 11 (11*a*) and the temperature sensor 1 (1*a*, 1*b*) may be understood as a sensor attachment structure 73.

The sensor attachment structure 73 includes an attachment partner 11 and a sensor (for example, a temperature sensor) 1.

The attachment partner 11 includes a cylindrical part 13, a flange 15, and a locking projection 17. The flange 15 is provided at an end of the cylindrical part 13 integrally with the cylindrical part 13. A cutout 19 is formed in the flange 15. The locking projection 17 projects from the flange 15 on an opposite side to the cylindrical part 13.

The sensor 1 includes an insertion part 3, an abutting part 5, a locked part 7, and a projection 9. The insertion part 3 is inserted into the cylindrical part 13 of the attachment partner 11 when the sensor 1 is attached to the attachment partner 11. The abutting part 5 is provided at one end of the insertion part 3 and abuts the flange 15 of the attachment partner 11 when the insertion part 3 is completely inserted into the cylindrical part 13 of the attachment partner 11.

The locked part 7 is provided on the abutting part 5 and is locked with the locking projection 17 of the attachment partner 11 when the temperature sensor 1 is completely mounted on the attachment partner 11.

The projection 9 is provided integrally with the insertion part 3, and enters a cutout 19 provided in the flange 15 of the attachment partner 11 when the temperature sensor 1 is completely attached to the attachment partner 11. When the temperature sensor 1 is completely attached to the attachment partner 11, the projection 9 clamps the flange 15 of the attachment partner 11 together with the abutting part 5 in an insertion direction of the insertion part 3. Further, when the temperature sensor 1 is completely attached to the attachment partner 11, the projection 9 clamps the flange 15 of the attachment partner 11 together with the locked part 7 in a direction crossing the insertion direction of the insertion part 3.

As described above, the attachment partner 11 of the sensor attachment structure 73 includes the cylindrical part 13, the flange 15, the cutout 19, and the locking projection 17. Further, the sensor 1 includes the insertion part 3, the abutting part 5, the locked part 7, and the projection 9.

Thus, the material cost of the temperature sensor 1 and the attachment partner 11 can be reduced compared with a case of the temperature sensor 1 having a structure with a metal housing. In addition, since there is no screw part, torque management during mounting is not necessary, and assembling properties are improved. Moreover, the rotation angle of the temperature sensor 1 with respect to the attachment partner 11 can be constant at the completion of the mounting, and reproducibility in the mounting can be obtained.

The temperature sensors 1, 1*a*, and 1*b* described above are examples of temperature sensors including a sensor body, a resin abutting part, a resin locked part, and a resin fixing rib (lower projecting part).

The sensor body includes lead frames, a thermistor provided with the lead frames, and a resin main body integrated with the lead frames and the thermistor by covering a part of the lead frames and the thermistor.

The abutting part is provided on the resin main body of the sensor body, and abuts the abutted part (flange) of the attachment partner when the attachment to the attachment partner is conducted. The locked part is provided on the resin main body of the sensor body, and is locked with the locking part of the attachment partner when the attachment to the attachment partner is conducted.

The fixing rib is provided on the resin main body of the sensor body, and clamps the attachment partner together with the abutting part in a predetermined first direction (for example, in the height direction) when the temperature sensor is attached to the attachment partner. Further, when the attachment to the attachment partner is conducted, the fixing rib clamps the attachment partner together with the locked part in a predetermined second direction different from the first direction (for example, a circumferential direction of the temperature sensor 1).

The temperature sensor includes the sensor body, the abutting part, the locked part, and the fixing rib. The abutting part made of resin is provided on the resin main body of the sensor body, and abuts the abutting part of the attachment partner when the attachment to the attachment partner is conducted. The locked part made of resin is provided on the main body of the sensor body, and is locked with the locking part of the attachment partner when attachment of the temperature sensor to the attachment partner is conducted. The fixing rib made of resin is provided on the sensor body, and when attachment of the temperature sensor to the attachment partner is conducted, the attachment partner is clamped together with the abutting part in the predetermined first direction, and the attachment partner is clamped together with the locking part of the attachment partner in the predetermined second direction.

As a result, the material cost of the temperature sensor and the attachment partner can be reduced compared with the case of the structure with the metal housing. In addition, since there is no screw part, torque management during mounting is not necessary, and assembling properties are improved.

The temperature sensors 1, 1*a*, and 1*b* described above may be understood as a temperature sensor having a sensor body, a first abutting part, a locked part, and a second abutting part. The first abutting is provided on the sensor body, and abuts the first abutting part of the attachment partner when attachment of the temperature sensor to the attachment partner is conducted. The locked part is provided on the sensor body, and is locked with the locking part of the attachment partner when attachment of the temperature sensor to the attachment partner is conducted.

The second abutting part is provided on the sensor body, and abuts the second abutting portion of the attachment partner when attachment of the temperature sensor to the attachment partner is conducted. The attachment partner is clamped together with the first abutting part in the predetermined first direction, and the attachment partner is clamped together with the locked part in the predetermined second direction.

Although the present embodiments have been described above, the present embodiments are not limited to these, and various modifications are possible within the scope of the contents of the present embodiments.

The invention claimed is:

1. A temperature sensor, comprising:

an insertion part inserted into an attachment partner;

an abutting part integrally provided on the insertion part and abutting the attachment partner when the insertion part is completely inserted into the attachment partner;

a locked part provided on the abutting part and locked with a locking projection of the attachment partner; and a projection integrally provided on the insertion part, inserted into a cutout provided in the attachment partner, clamping the attachment partner together with the abutting part in an insertion direction of the insertion part, and clamping the attachment partner together with the locked part in a direction crossing the insertion direction of the insertion part.

2. The temperature sensor according to claim 1, wherein the locked part is formed by a cutout provided in the abutting part and comprises an elastic arm in a form of a cantilever with long extension and elasticity, and a locked projection provided on the elastic arm, and in a state in which the temperature sensor is in the process of being rotated with respect to the attachment partner after the insertion part is completely inserted into the attachment partner, the locked projection abuts the locking projection of the attachment partner, so that the elastic arm is elastically deformed, and the elastic arm is restored when the temperature sensor is completely attached to the attachment partner, so that the locked part is locked with the locking projection of the attachment partner.

3. The temperature sensor according to claim 2, wherein the locked projection is provided at a tip of the elastic arm and projects toward a center side of the abutting part, or the locked projection is provided at the tip of the elastic arm, and projects toward an opposite side to the center side of the abutting part.

4. The temperature sensor according to claim 2, wherein a locked part protector is formed by the cutout provided in the abutting part.

5. A sensor attachment structure, comprising:

an attachment partner comprising a cylindrical part, a flange provided at an end of the cylindrical part, a cutout formed in the flange, and a locking projection projecting from the flange on an opposite side to the cylindrical part; and a sensor comprising an insertion part inserted into the cylindrical part, an abutting part provided at one end of the insertion part integrally with the insertion part and abutting the flange when the insertion part is completely inserted into the cylindrical part, a locked part provided on the abutting part and locked with a locking projection, and a projection integrally provided on the insertion part, inserted into the cutout formed in the flange, clamping the flange together with the abutting part in an insertion direction of the insertion part, and clamping the flange together with the locked part in a direction crossing the insertion direction of the insertion part.

* * * * *